US012763472B2

(12) United States Patent
Yamada et al.

(10) Patent No.: US 12,763,472 B2
(45) Date of Patent: Oct. 13, 2026

(54) ANTENNA MODULE AND COMMUNICATION APPARATUS INCLUDING THE SAME

(71) Applicant: Murata Manufacturing Co., Ltd., Nagaokakyo (JP)

(72) Inventors: Yoshiki Yamada, Nagaokakyo (JP); Ryo Komura, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 72 days.

(21) Appl. No.: 18/895,403

(22) Filed: Sep. 25, 2024

(65) Prior Publication Data

US 2025/0015500 A1 Jan. 9, 2025

Related U.S. Application Data

(63) Continuation of application No. PCT/JP2023/003061, filed on Jan. 31, 2023.

(30) Foreign Application Priority Data

Mar. 28, 2022 (JP) ................................ 2022-051638
Jul. 22, 2022 (JP) ................................ 2022-117356

(51) Int. Cl.
*H01Q 9/04* (2006.01)
*H01Q 1/24* (2006.01)
(Continued)

(52) U.S. Cl.
CPC ........... *H01Q 9/0414* (2013.01); *H01Q 1/243* (2013.01); *H01Q 1/48* (2013.01); *H01Q 5/10* (2015.01);
(Continued)

(58) Field of Classification Search
CPC ........ H01Q 9/0414; H01Q 1/243; H01Q 1/48; H01Q 5/10; H01Q 5/28; H01Q 5/385; H01Q 9/28
See application file for complete search history.

(56) References Cited

U.S. PATENT DOCUMENTS 12,327,914 B2 * 6/2025 Yamada .................. H01Q 1/50
2023/0006350 A1 * 1/2023 Arai ..................... H01Q 1/2283
(Continued)

FOREIGN PATENT DOCUMENTS

JP 2005-142786 A 6/2005
WO 2020/100412 A1 5/2020
(Continued)

OTHER PUBLICATIONS

International Search Report and Written Opinion mailed on Mar. 28, 2023, received for PCT Application PCT/JP2023/003061, filed on Jan. 31, 2023, 9 pages including English Translation.

*Primary Examiner* — Hai V Tran
(74) *Attorney, Agent, or Firm* — XSENSUS LLP

(57) ABSTRACT

An antenna module includes a dielectric substrate, a ground electrode in the dielectric substrate, planar radiating elements, and a peripheral electrode. One radiating element faces the ground electrode. Another radiating element is between the one radiating element and the ground electrode. The peripheral electrode is in a layer of the dielectric substrate between the ground electrode and the other radiating element and electrically connects to the ground electrode. The other radiating element emits a radio wave in a frequency band lower than a frequency band of a radio wave emitted by the one radiating element. The peripheral electrode includes multiple planar electrodes stacked in a first direction in which the one radiating element faces the ground electrode. One planar electrode is in a layer between
(Continued)

another planar electrode and the ground electrode. The size of the other planar electrode is less than the size of the one planar electrode.

20 Claims, 18 Drawing Sheets

(51) Int. Cl.

| | |
|---|---|
| ***H01Q 1/48*** | (2006.01) |
| ***H01Q 5/10*** | (2015.01) |
| ***H01Q 5/28*** | (2015.01) |
| ***H01Q 5/385*** | (2015.01) |
| ***H01Q 9/28*** | (2006.01) |

(52) U.S. Cl.
CPC ............... *H01Q 5/28* (2015.01); *H01Q 5/385* (2015.01); *H01Q 9/28* (2013.01)

(56) References Cited

U.S. PATENT DOCUMENTS

| | | | | |
|---|---|---|---|---|
| 2023/0411866 | A1* | 12/2023 | Yamada ................... | H01Q 1/38 |
| 2024/0113433 | A1* | 4/2024 | Onaka .................. | H01Q 9/0442 |
| 2024/0405447 | A1* | 12/2024 | Sudo ...................... | H01Q 1/526 |

FOREIGN PATENT DOCUMENTS

| | | | |
|---|---|---|---|
| WO | 2020/261807 | A1 | 12/2020 |
| WO | 2021/059661 | A1 | 4/2021 |

* cited by examiner (A)

(B)

ANTENNA MODULE AND COMMUNICATION APPARATUS INCLUDING THE SAME

CROSS-REFERENCE TO RELATED APPLICATIONS

This application is a continuation of international application no. PCT/JP2023/003061, filed Jan. 31, 2023, and which claims priority to Japanese application nos. 2022-051638, filed Mar. 28, 2022, and 2022-117356, filed Jul. 22, 2022. The entire contents of all prior applications are hereby incorporated by reference.

TECHNICAL FIELD

The present disclosure relates to an antenna module and a communication apparatus including the antenna module and, more particularly, relates to a technology for improving antenna characteristics.

BACKGROUND ART

A planar patch antenna has a peripheral electrode, including multiple planar electrodes, that is disposed in a layer between a radiating element and a ground electrode. The peripheral electrode is connected to the ground electrode. Also, the peripheral electrode is coupled with the radiating element by electromagnetic field coupling and can therefore prevent electric lines of force formed by the radiating element from going around to the back side of an antenna module. This makes it possible to suppress the deterioration of antenna characteristics even when the area of the ground electrode cannot be made sufficiently large.

SUMMARY

Technical Problem

The peripheral electrode discussed above is used for a so-called dual-band patch antenna, in which radiating elements with different sizes (i.e., with different frequency bands) are stacked, to improve the antenna characteristics of a radiating element on the low frequency side.

Through diligent research, the inventor of the present disclosure has found out that the antenna characteristics of a radiating element on the high frequency side can also be improved by improving the structure of a peripheral electrode that is used, as described above, to improve the antenna characteristics of a radiating element on the low frequency side.

An exemplary object of the present disclosure is to improve the antenna characteristics of an antenna module capable of emitting radio waves in two different frequency bands while reducing the size of the antenna module.

Solution to Problem

An antenna module according to the present disclosure includes a dielectric substrate, a ground electrode disposed in the dielectric substrate, a first radiating element and a second radiating element having a planar shape, and a first peripheral electrode. The first radiating element is disposed to face the ground electrode. The second radiating element is disposed in the dielectric substrate between the first radiating element and the ground electrode. The first peripheral electrode is disposed in a layer of the dielectric substrate between the ground electrode and the second radiating element and is electrically connected to the ground electrode. The first radiating element is configured to emit a radio wave in a first frequency band. The second radiating element is configured to emit a radio wave in a second frequency band that is lower than the first frequency band. The first peripheral electrode includes multiple planar electrodes that are stacked in a first direction in which the first radiating element faces the ground electrode. The multiple planar electrodes include a first electrode and a second electrode disposed in a layer between the first electrode and the ground electrode. The size of the second electrode is less than the size of the first electrode.

Advantageous Effects

In an antenna module according to the present disclosure, multiple planar electrodes constituting a peripheral electrode include a first electrode and a second electrode with different lengths, and the second electrode with a shorter length is disposed closer to a ground electrode than the first electrode. With this configuration, the peripheral electrode operates as a dielectric resonator, and an attenuation pole is generated near the frequency band of a radiating element on the high frequency side. This makes it possible to expand the frequency band width of the radiating element on the high frequency side. In other words, the antenna characteristics of a radiating element on the high frequency side can also be improved by using a peripheral electrode that is provided to suppress the deterioration of the antenna characteristics of a radiating element on the low frequency side resulting from miniaturization. This in turn makes it possible to improve the antenna characteristics of an antenna module capable of emitting radio waves in two different frequency bands while reducing the size of the antenna module.

DESCRIPTION OF EMBODIMENTS

Figure 1:
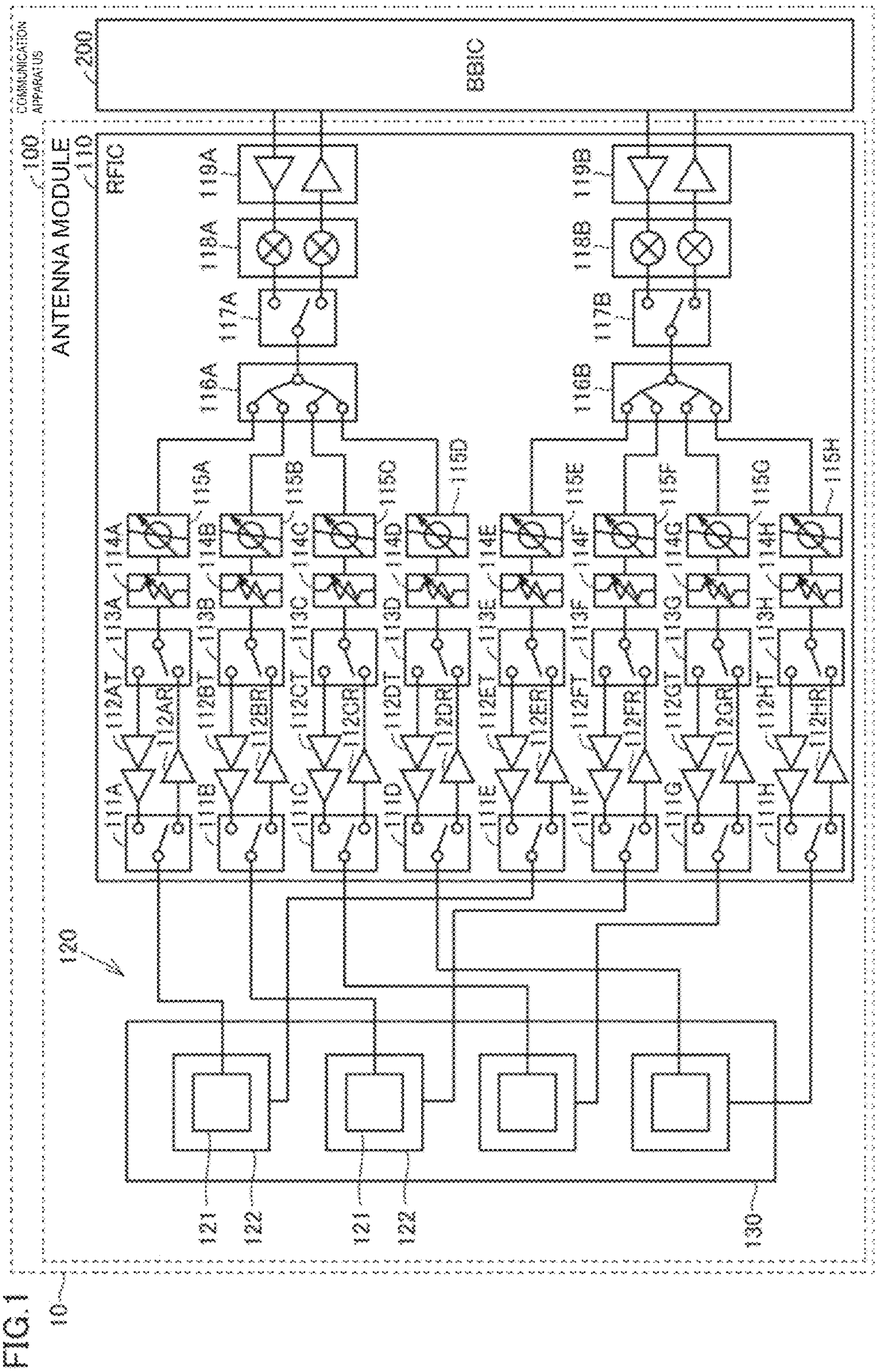
FIG. 1 is a block diagram illustrating a communication apparatus for which an antenna module according to a first exemplary embodiment is used.

Embodiments of the present disclosure are described in detail below with reference to the drawings. The same reference number is assigned to the same or similar components in the drawings, and the descriptions of those components are not repeated.

First Embodiment

Basic Configuration of Communication Apparatus

FIG. 1 is a block diagram of a communication apparatus 10 for which an antenna module 100 according to a first exemplary embodiment is used. The communication apparatus 10 is, for example, a mobile terminal, such as a mobile phone, a smartphone, or a tablet computer, or a personal computer having a communication function. Examples of frequency bands of radio waves used for the antenna module 100 according to the present exemplary embodiment include millimeter bands with center frequencies of 28 GHz, 39 GHz, and 60 GHz. However, radio waves in frequency bands other than these frequency bands may also be used.

Referring to FIG. 1, the communication apparatus 10 includes an antenna module 100 and a base band integrated circuit (BBIC) 200 that implements a baseband signal processing circuit. The antenna module 100 includes a radio frequency integrated circuit (RFIC 110), which is an example of a feed circuit, and an antenna device 120. The communication apparatus 10 up-converts a signal transmitted from the BBIC 200 to the antenna module 100 into a radio frequency signal and emits the radio frequency signal from the antenna device 120. Also, the communication apparatus 10 down-converts a radio frequency signal received by the antenna device 120 and processes the down-converted signal with the BBIC 200.

The antenna module 100 is a so-called dual-band antenna module that can emit radio waves in two different frequency bands. The antenna device 120 includes multiple radiating elements 121 and 122 disposed in or on a dielectric substrate 130. Radiating elements 121 are capable of emitting radio waves on the relatively high frequency side. Radiating elements 122 are capable of emitting radio waves on the relatively low frequency side.

For ease of description, FIG. 1 illustrates an example in which the antenna device 120 is implemented by a one-dimensional array of four pairs of radiating elements 121 and 122 that are arranged in a row in or on the dielectric substrate 130 with a rectangular shape. However, the number of pairs of radiating elements is not limited to four. Also, as described later, the antenna device 120 may be implemented by one radiating element 121 and one radiating element 122 or may be implemented by multiple pairs of radiating elements 121 and 122 arranged in a two-dimensional array.

Each of the radiating elements 121 and 122 is a planar patch antenna with a circular, elliptical, or polygonal shape. In the present exemplary embodiment, it is assumed that each of the radiating elements 121 and 122 is a microstrip antenna with a substantially square shape.

The RFIC 110 includes switches 111A to 111H, 113A to 113H, 117A, and 117B, power amplifiers 112AT to 112HT, low noise amplifiers 112AR to 112HR, attenuators 114A to 114H, phase shifters 115A to 115H, signal combiner/splitters 116A and 116B, mixers 118A and 118B, and amplifier circuits 119A and 119B. Among these components, the switches 111A to 111D, 113A to 113D, and 117A, the power amplifiers 112AT to 112DT, the low noise amplifiers 112AR to 112DR, the attenuators 114A to 114D, the phase shifters 115A to 115D, the signal combiner/splitter 116A, the mixer 118A, and the amplifier circuit 119A correspond to circuitry for radio frequency signals emitted from the radiating elements 121. Also, the switches 111E to 111H, 113E to 113H, and 117B, the power amplifiers 112ET to 112HT, the low noise amplifiers 112ER to 112 HR, the attenuators 114E to 114H, the phase shifters 115E to 115H, the signal combiner/splitter 116B, the mixer 118B, and the amplifier circuit 119B correspond to circuitry for radio frequency signals emitted from the radiating elements 122.

When transmitting radio frequency signals, the switches 111A to 111H and 113A to 113H are switched to the power amplifiers 112AT to 112HT, and the switches 117A and 117B are connected to transmission amplifiers of the amplifier circuits 119A and 119B. When receiving radio frequency signals, the switches 111A to 111H and 113A to 113H are switched to the low noise amplifiers 112AR to 112HR, and the switches 117A and 117B are connected to reception amplifiers of the amplifier circuits 119A and 119B.

Signals transmitted from the BBIC 200 are amplified by the amplifier circuits 119A and 119B and up-converted by the mixers 118A and 118B. Each transmission signal, which is an up-converted radio frequency signal, is split by the corresponding one of the signal combiner/splitters 116A and 116B into four signals, and the four signals pass through the corresponding signal paths and are supplied to different radiating elements 121 and 122. The directivity of radio waves output from the radiating elements on the substrate can be adjusted by individually adjusting the degrees of phase shift of the phase shifters 115A to 115H disposed in the corresponding signal paths.

Reception signals, which are radio frequency signals received by the radiating elements 121 or 122, are transmitted to the RFIC 110, pass through four different signal paths, and are combined by the corresponding one of the signal combiner/splitters 116A and 116B. The combined reception signals are down-converted by one of the mixers 118A and 118B, amplified by one of the amplifier circuits 119A and 119B, and transmitted to the BBIC 200.

For example, the RFIC 110 is formed as a one-chip integrated circuit component having the circuit configuration described above. Alternatively, devices (switches, a power amplifier, a low noise amplifier, an attenuator, and a phase shifter) of the RFIC 110 for each of the radiating elements 121 and 122 may be formed as a one-chip integrated circuit component.

Configuration of Antenna Module

Next, details of the configuration of the antenna module 100 according to the first exemplary embodiment are described with reference to FIGS. 2 and 3. The upper part of FIG. 2 (FIG. 2(A)) is a plan view of the antenna module 100, and the lower part of FIG. 2 (FIG. 2(B)) is a side transparent view of the antenna module 100 seen from the negative Y-axis direction in FIG. 2. FIG. 3 is a side transparent view of the antenna module 100 seen from the positive X-axis direction. For ease of description, FIGS. 2 and 3 illustrate an example in which one radiating element 121 and one radiating element 122 are provided.

Figure 2:
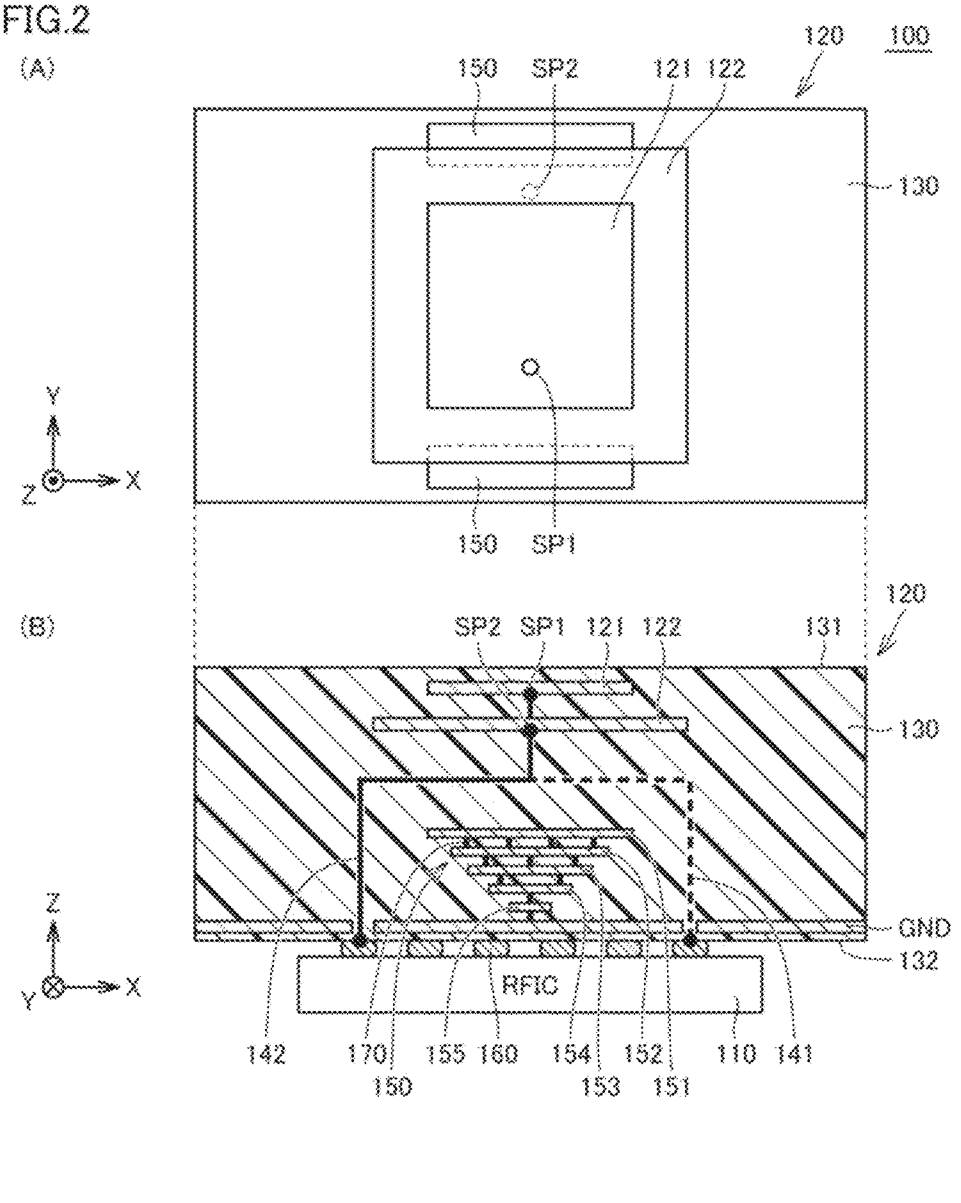
FIG. 2 is a plan view of the antenna module illustrated in FIG. 1 and a side transparent view of the antenna module seen from the Y-axis direction.
Figure 3:
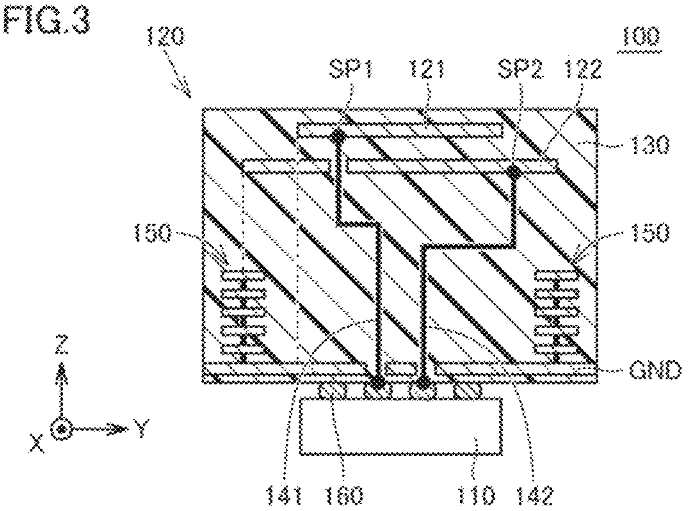
FIG. 3 is a side transparent view of the antenna module of FIG. 2 seen from the X-axis direction.

Referring to FIGS. 2 and 3, the antenna module 100 includes feeding wires 141 and 142, peripheral electrodes 150, and a ground electrode GND in addition to the dielectric substrate 130, the radiating elements 121 and 122, and the RFIC 110. In the descriptions below, the normal direction (the direction in which radio waves are emitted) of the dielectric substrate 130 is referred to as a Z-axis direction. Also, in a plane perpendicular to the Z-axis direction, a direction along the long side of the rectangular dielectric substrate 130 is referred to as an X-axis direction, and a direction along the short side of the dielectric substrate 130 is referred to as a Y-axis direction. Furthermore, in each diagram, the positive Z-axis direction may be referred to as an upper side, and the negative Z-axis direction may be referred to as a lower side.

The dielectric substrate 130 is, for example, low temperature co-fired ceramics (LTCC) multilayer substrate, a multilayer resin substrate formed by stacking multiple resin layers comprised of resin such as epoxy or polyimide, a multilayer resin substrate formed by stacking multiple resin layers comprised of liquid crystal polymer (LCP) with a lower permittivity, a multilayer resin substrate formed by stacking multiple resin layers comprised of fluororesin, a multilayer resin substrate formed by stacking multiple resin layers comprised of a polyethylene terephthalate (PET) material, or a ceramic multilayer substrate other than LTCC. The dielectric substrate 130 does not necessarily have a multilayer structure and may be a single-layer substrate.

The dielectric substrate 130 has a rectangular shape in plan view from the normal direction (the Z-axis direction). The length of the sides of the dielectric substrate 130 along the Y-axis is shorter than the length of the sides of the dielectric substrate 130 along the X-axis. The radiating element 121 is disposed in a layer (upper-side layer) closer to an upper surface 131 (a surface facing the positive Z-axis direction) of the dielectric substrate 130. The radiating element 121 may be exposed on the surface of the dielectric substrate 130 or may be disposed inside of the dielectric substrate 130 as in the examples of FIG. 2(B) and FIG. 3.

The radiating element 122 is disposed in a dielectric layer closer to a lower surface 132 than the radiating element 121 to face the radiating element 121. The ground electrode GND is disposed over the entire surface of the dielectric substrate 130 at a position close to the lower surface 132 of the dielectric substrate 130. In plan view from the normal direction (the Z-axis direction) of the dielectric substrate 130, the radiating elements 121 and 122 and the ground electrode GND overlap each other. That is, the radiating element 122 is disposed between the radiating element 121 and the ground electrode GND.

The size of the radiating element 121 is smaller than the size of the radiating element 122 and therefore, the resonant frequency of the radiating element 121 is higher than the resonant frequency of the radiating element 122. Therefore, the frequency band of radio waves emitted from the radiating element 121 is higher than the frequency band of radio waves emitted from the radiating element 122. Thus, the antenna module 100 is a dual-band antenna module that has a stack structure and is capable of emitting radio waves in two different frequency bands.

Radio frequency signals are supplied from the RFIC 110 via the feeding wires 141 and 142 to the radiating elements 121 and 122. The feeding wire 141 extends from the RFIC 110, passes through the ground electrode GND and the radiating element 122, and is connected to a feeding point SP1 of the radiating element 121. The feeding wire 142 extends from the RFIC 110, passes through the ground electrode GND, and is connected to a feeding point SP2 of the radiating element 122. The feeding point SP1 is offset from the center of the radiating element 121 in the negative Y-axis direction, and the feeding point SP2 is offset from the center of the radiating element 122 in the positive Y-axis direction. With this configuration, a radio wave with a polarization direction corresponding to the Y-axis direction is emitted from each of the radiating elements 121 and 122.

The RFIC 110 is mounted on the lower surface 132 of the dielectric substrate 130 via solder bumps 160. The RFIC 110 may be connected to the dielectric substrate 130 by using a multipolar connector instead of solder connection.

In the antenna module 100, the peripheral electrodes 150 are formed in the end portions of the dielectric substrate 130 in the Y-axis direction (i.e., the polarization direction). Each peripheral electrode 150 has a strip shape in plan view of the dielectric substrate 130 from the normal direction (the Z-axis direction) and extends in the X-axis direction in one of the end portions of the dielectric substrate 130 in the Y-axis direction. In FIG. 2, the peripheral electrode 150 has a rectangular shape. The peripheral electrode 150 is disposed in the middle of the corresponding side of the radiating element 122 extending along the X-axis direction to ensure the symmetry of an emitted radio wave. The peripheral electrode 150 extends in a direction that intersects the polarization direction (the Y-axis direction) of the radiating elements 121 and 122.

In plan view from the normal direction of the dielectric substrate 130, the peripheral electrode 150 is positioned so as not to overlap the radiating element 121 on the high frequency side. On the other hand, at least a part of the peripheral electrode 150 overlaps the radiating element 122 on the low frequency side. It is not essential that the peripheral electrode 150 and the radiating element 122 overlap each other. However, disposing the peripheral electrode 150 and the radiating element 122 to partially overlap each other makes it possible to reduce the dimension of the dielectric substrate 130 in the Y-axis direction.

The peripheral electrode 150 includes multiple planar electrodes 151 to 155 arranged in the stacking direction (the Z-axis direction) of the dielectric substrate 130 and at least one via 170 that electrically connects the planar electrodes 151 to 155 to each other. The via 170 is connected to the ground electrode GND. Therefore, the potential of the peripheral electrode 150 becomes the ground potential.

When the area of the ground electrode GND is limited due to, for example, the demand for the miniaturization of the antenna module 100 in the Y-axis direction, an electric field generated between the radiating element 122 on the low frequency side and the ground electrode GND may partially go around to the back side of the ground electrode GND. In the above case, compared to a case in which the area of the ground electrode GND is sufficiently large, the emission of radio waves from the radiating element 122 is hindered due to the generation of such an electric field, and as a result, the antenna characteristics may deteriorate.

However, with the peripheral electrodes 150 provided, because electric lines of force are preferentially generated between the radiating element 122 and the peripheral electrodes 150, the generation of an electric field going around to the back side of the ground electrode GND is suppressed. For this reason, even when the area of the ground electrode GND is limited due to the demand for miniaturization, it is possible to suppress the deterioration of the antenna characteristics of the radiating element 122.

In the antenna module 100 of the first exemplary embodiment, as illustrated in the lower part of FIG. 2, the dimensions along the X-axis direction of the planar electrodes 151 to 155 constituting each peripheral electrode 150 are different from each other. More specifically, the dimension (size) of the planar electrode 151 closest to the upper surface 131 is longest, and the dimensions (sizes) of the planar electrodes 151 to 155 gradually decrease toward the ground electrode GND. In other words, in a view of the dielectric substrate 130 from the Y-axis direction, as illustrated in the lower part of FIG. 2, the peripheral electrode 150 as a whole has an inverted triangle shape.

The maximum dimension along the X-axis of the peripheral electrode 150, i.e., the dimension of the planar electrode 151, is less than the dimension of each side of the radiating element 122 and is substantially the same as the dimension of each side of the radiating element 121 on the high frequency side. More specifically, the dimension of the planar electrode 151 is set to about $\lambda_g/2$, where $\lambda_g$ indicates the wavelength in the dielectric substrate 130 of a radio frequency signal emitted from the radiating element 121, the wavelength being obtained taking into account the permittivity of the dielectric substrate 130. The dimension of the planar electrode 151 is not necessarily exactly the same as $\lambda_g/2$ and may be within ±25% of $\lambda_g/2$. When the radiating element 121 has a circular shape, an elliptical shape, or a polygonal shape other than a square shape, the dimension of the peripheral electrode 150 is set to a value that is substantially the same as the maximum outer diameter of the radiating element 121 in the X-axis direction.

The peripheral electrode 150 with a shape as described above functions as a dielectric resonator. More specifically, the peripheral electrode 150 has a configuration in which two $\lambda_g/4$ resonators are combined. Furthermore, by adjusting the dimension of the peripheral electrode 150 to a value corresponding to the radiating element 121 as described above, it is possible to generate a pole near the frequency band of the radiating element 121. Therefore, the antenna characteristics of the radiating element 121 can be improved by appropriately adjusting the dimension of the peripheral electrode 150.

Antenna Characteristics

Next, the antenna characteristics of the antenna module 100 of the first exemplary embodiment are described using a peripheral electrode of a comparative example.

Figure 4:
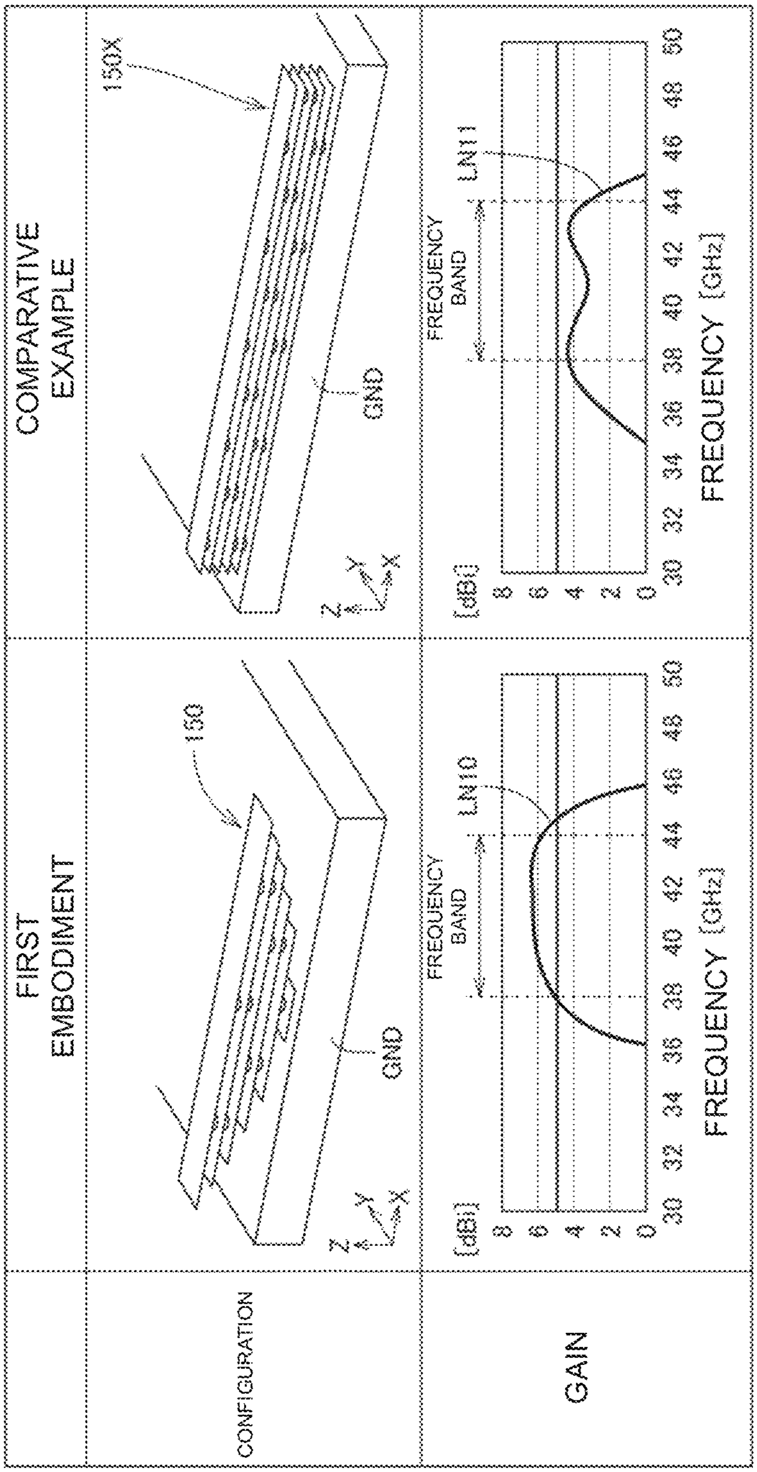
FIG. 4 is a diagram for describing the gain characteristics of antenna modules according to the first exemplary embodiment and a comparative example.

FIG. 4 is a diagram for describing the gain characteristics of antenna modules according to the first exemplary embodiment and a comparative example. In FIG. 4, the left column corresponds to the first exemplary embodiment, and the right column corresponds to the comparative example. The upper row of FIG. 4 shows schematic perspective views of peripheral electrodes, and the lower row shows antenna gains.

A peripheral electrode 150X of the comparative example includes multiple planar electrodes with the same length and is connected to the ground electrode GND through multiple vias. The length of the planar electrodes of the peripheral electrode 150X along the Y-axis is set to a value longer than each side of the radiating element 122.

As shown in the lower row of FIG. 4, in the case of the peripheral electrode 150X of the comparative example, the antenna gain is less than 5 dBi in the entire band width (38 GHz to 44 GHz) for the radiating element 121 as indicated by a line LN11. On the other hand, in the case of the peripheral electrode 150 of the first exemplary embodiment, as indicated by a line LN10, an antenna gain of 5 dBi or more is achieved in the entire target band width.

Figure 5:
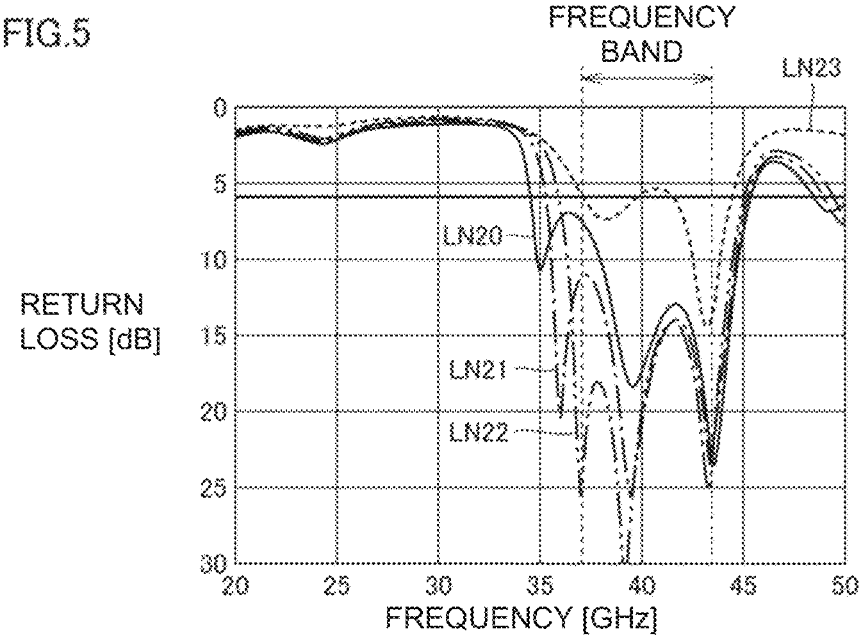
FIG. 5 is a diagram for describing the influence of return loss due to the length of a peripheral electrode.

FIG. 5 is a diagram showing return loss observed by changing the maximum length of planar electrodes of a peripheral electrode. In FIG. 5, a solid line LN20 indicates the case of the peripheral electrode 150 of the first exemplary embodiment, and a dotted line LN23 indicates the case of the peripheral electrode 150X of the comparative example. Also, a dashed-dotted line LN21 indicates the case of a peripheral electrode of a first example that has a shape similar to the shape of the peripheral electrode 150 and includes planar electrodes shorter than those of the peripheral electrode 150. A dashed-two dotted line LN22 indicates the case of a peripheral electrode of a second example including even shorter planar electrodes.

As shown in FIG. 5, in each of the first exemplary embodiment, the first example, and the second example, compared to the comparative example, a pole is newly added on the low frequency side of the target frequency band. This pole is considered to be generated as a result of the peripheral electrode functioning as a dielectric resonator as described above. The frequency at which the pole is generated is shifted toward the high frequency side as the planar electrodes become shorter. In the example of FIG. 5, the return loss is reduced over a wider range by adjusting the maximum length of the planar electrodes such that a pole is generated at around 35 GHz.

Here, from the viewpoint of the radiating element 121 on the high frequency side, the radiating element 122 on the low frequency side is considered to be a virtual ground electrode, and radio waves are emitted from the radiating element 121 as a result of electromagnetic field coupling between the radiating element 121 and the radiating element 122.

The peripheral electrode is disposed closer to the radiating element 122 than the ground electrode GND and is therefore more likely to be capacitively coupled with the radiating element 122. Therefore, a part of an electric current flowing through the radiating element 122 as a result of electromagnetic field coupling with the radiating element 121 may flow to the ground electrode GND via the peripheral electrode (arrows AR2 in FIG. 6).

Figure 6:
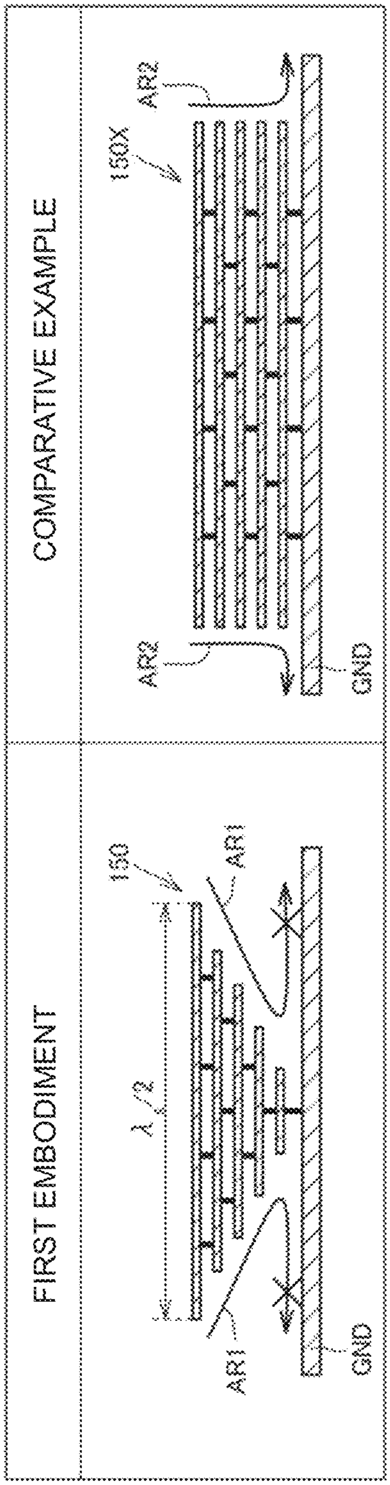
FIG. 6 is a diagram for describing why the antenna characteristics of an antenna module according to the first exemplary embodiment are improved.

However, when the lengths of planar electrodes decrease toward the ground electrode as in the peripheral electrode 150 of the first exemplary embodiment, as indicated by arrows AR1 in FIG. 6, the electric current passing through the peripheral electrode 150 and the electric current flowing through the ground electrode GND cancel each other out, resulting in a reduction of the electric current flowing through the ground electrode GND. This is supposed to strengthen the coupling between the radiating elements 121 and 122 and improve the antenna gain.

As described above, when the area of a ground electrode is limited for the purpose of miniaturization, the antenna characteristics (the frequency band width and the antenna gain) of a radiating element on the high frequency side can also be improved by adjusting the dimensions and the shape of a peripheral electrode provided to improve the antenna characteristics of a radiating element on the low frequency side. This makes it possible to improve the antenna characteristics of a dual-band antenna module while reducing the size of the entire antenna module.

Variations of Peripheral Electrodes

Variations of peripheral electrodes are described below with reference to FIGS. 7 to 11.

First Variation

Figure 7:
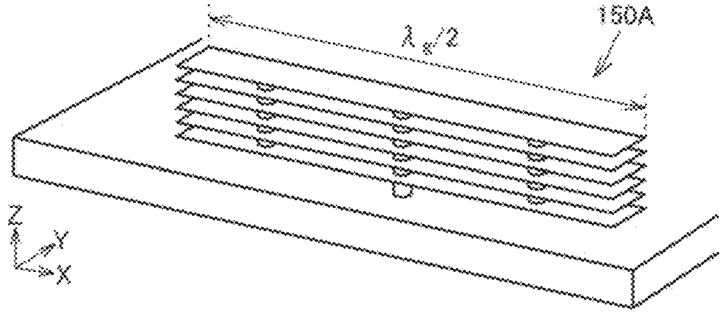
FIG. 7 is a diagram illustrating the configuration of a peripheral electrode according to a first variation.

FIG. 7 is a perspective view illustrating the configuration of a peripheral electrode 150A of a first variation. Similarly to the comparative example described above, the peripheral electrode 150A includes multiple planar electrodes with the same length. However, the length of the planar electrodes is set to a value that is substantially the same as the dimension ($\lambda_g/2$) of each side of the radiating element 121. Also, the lowermost planar electrode is connected to the ground electrode GND through one via. With this configuration, the peripheral electrode 150A also functions as a dielectric resonator, and at least a part of an electric current is cancelled out between the lowermost planar electrode and the ground electrode GND. Therefore, the configuration of the peripheral electrode 150A also makes it possible to improve the antenna characteristics while reducing the size of the entire antenna module.

Second Variation

Figure 8:
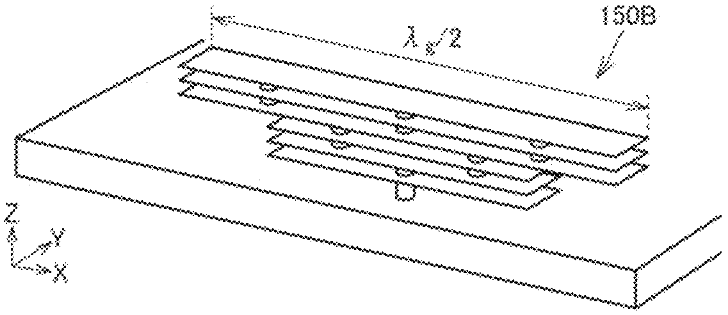
FIG. 8 is a diagram illustrating the configuration of a peripheral electrode according to a second variation.

FIG. 8 is a perspective view illustrating the configuration of a peripheral electrode 150B of a second variation. In summary, the peripheral electrode 150B has an intermediate configuration between the peripheral electrode 150 of the first exemplary embodiment and the peripheral electrode 150A of the first variation. More specifically, the maximum length of the planar electrodes of the peripheral electrode 150B is set to substantially $\lambda_g/2$, and the lengths of planar electrodes gradually decrease toward the ground electrode GND. Also, the lowermost planar electrode is connected to the ground electrode GND through one via. Although FIG. 8 illustrates an example in which the peripheral electrode includes planar electrodes of two different lengths, the peripheral electrode may include planar electrodes of three or more different lengths.

Even with this configuration, the peripheral electrode 150B functions as a dielectric resonator, and at least a part of an electric current is cancelled out between the lowermost planar electrode and the ground electrode GND. This makes it possible to improve the antenna characteristics while reducing the size of the entire antenna module.

Third Variation

Figure 9:
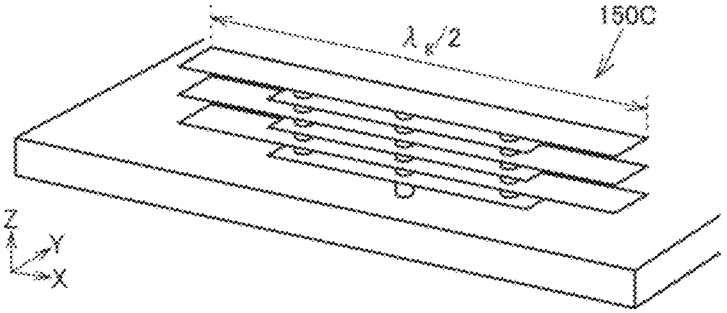
FIG. 9 is a diagram illustrating the configuration of a peripheral electrode according to a third variation.

FIG. 9 is a perspective view illustrating the configuration of a peripheral electrode 150C of a third variation. In the peripheral electrode 150C, first and second types of planar electrodes with a length of about $\lambda_g/2$ and a length of less than $\lambda_g/2$ are arranged alternately in the Z-axis direction. Also, the lowermost planar electrode is connected to the ground electrode GND through one via. In this variation, one planar electrode of the first type and one planar electrode of the second type may be arranged alternately. Alternatively, multiple (e.g., two or three) planar electrodes of the first type and multiple planar electrodes of the second type may be arranged alternately.

Even with this configuration, the peripheral electrode 150C functions as a dielectric resonator, and at least a part of an electric current is cancelled out between the lowermost planar electrode and the ground electrode GND. This makes it possible to improve the antenna characteristics while reducing the size of the entire antenna module.

Fourth Variation

Figure 10:
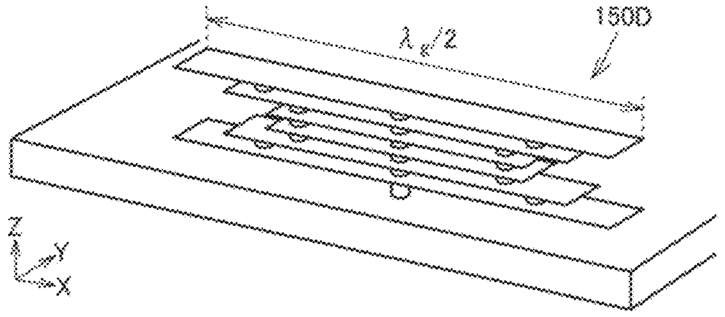
FIG. 10 is a diagram illustrating the configuration of a peripheral electrode according to a fourth variation.

FIG. 10 is a perspective view illustrating the configuration of a peripheral electrode 150D of a fourth variation. In the peripheral electrode 150D, the length of the uppermost planar electrode is set to about $\lambda_g/2$, the lengths of planar electrodes gradually decrease from the uppermost planar electrode toward the ground electrode GND up to an intermediate position, and the lengths of planar electrodes gradually increase from the intermediate position to the lowermost planar electrode. In other words, planar electrodes located in substantially the middle in the Z-axis direction are shorter than others, and as a result, the peripheral electrode 150D has a so-called "spool shape". Also, the lowermost planar electrode is connected to the ground electrode GND through one via.

Even with this configuration, the peripheral electrode 150D functions as a dielectric resonator, and at least a part of an electric current is cancelled out between the lowermost planar electrode and the ground electrode GND. This makes it possible to improve the antenna characteristics while reducing the size of the entire antenna module.

Fifth Variation

Figure 11:
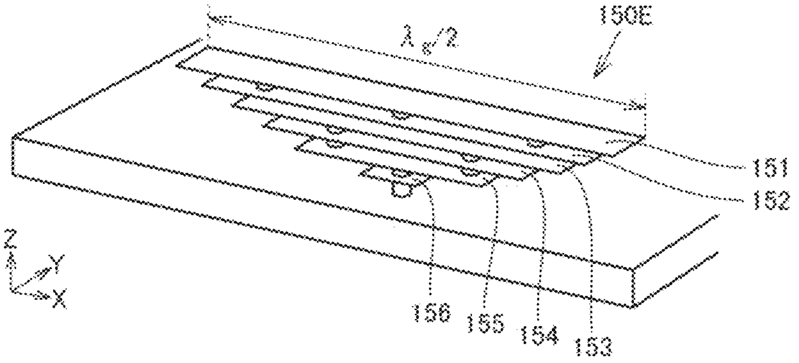
FIG. 11 is a diagram illustrating the configuration of a peripheral electrode according to a fifth variation.

FIG. 11 is a perspective view illustrating the configuration of a peripheral electrode 150E of a fifth variation. In the peripheral electrode 150E, similarly to the peripheral electrode 150 of the first exemplary embodiment, multiple planar electrodes 151 to 156 are arranged to form an inverted triangle shape, and the length of the uppermost planar electrode is set to a length of about $\lambda_g/2$. However, in the peripheral electrode 150E, no via is provided between the planar electrode 152 and the planar electrode 153 in FIG. 11, and the planar electrode 152 and the planar electrode 153 are capacitively coupled with each other. In this case, the potential of the planar electrodes 151 and 152 in FIG. 11, which are not directly connected to the ground electrode GND, becomes higher than the potential of the ground electrode GND by an amount resulting from the capacitive coupling. However, the peripheral electrode 150E provides substantially the same effect as the peripheral electrode 150 of the first exemplary embodiment.

Thus, even with a configuration in which some of multiple planar electrodes constituting a peripheral electrode are capacitively coupled with each other, it is possible to improve the antenna characteristics while reducing the size of the entire antenna module.

Influence on Horizontally Polarized Wave

As described above, in the antenna module 100 of the first exemplary embodiment, a radio wave with a polarization direction corresponding to the Y-axis direction is emitted from the radiating element 121, and the peripheral electrode 150 is disposed orthogonal to the polarization direction.

On the other hand, when the radiating element 121 is a so-called dual polarization antenna module that can also emit a radio wave with a polarization direction corresponding to the X-axis direction, because the peripheral electrode 150 extends parallel to the polarization direction, the peripheral electrode 150, which operates as a resonator, may influence the antenna characteristics related to the radio wave with that polarization direction. Here, for convenience, a radio wave polarized in the Y-axis direction is referred to as a "vertically polarized wave", and a radio wave polarized in the X-axis direction is referred to as a "horizontally polarized wave".

Figure 12:
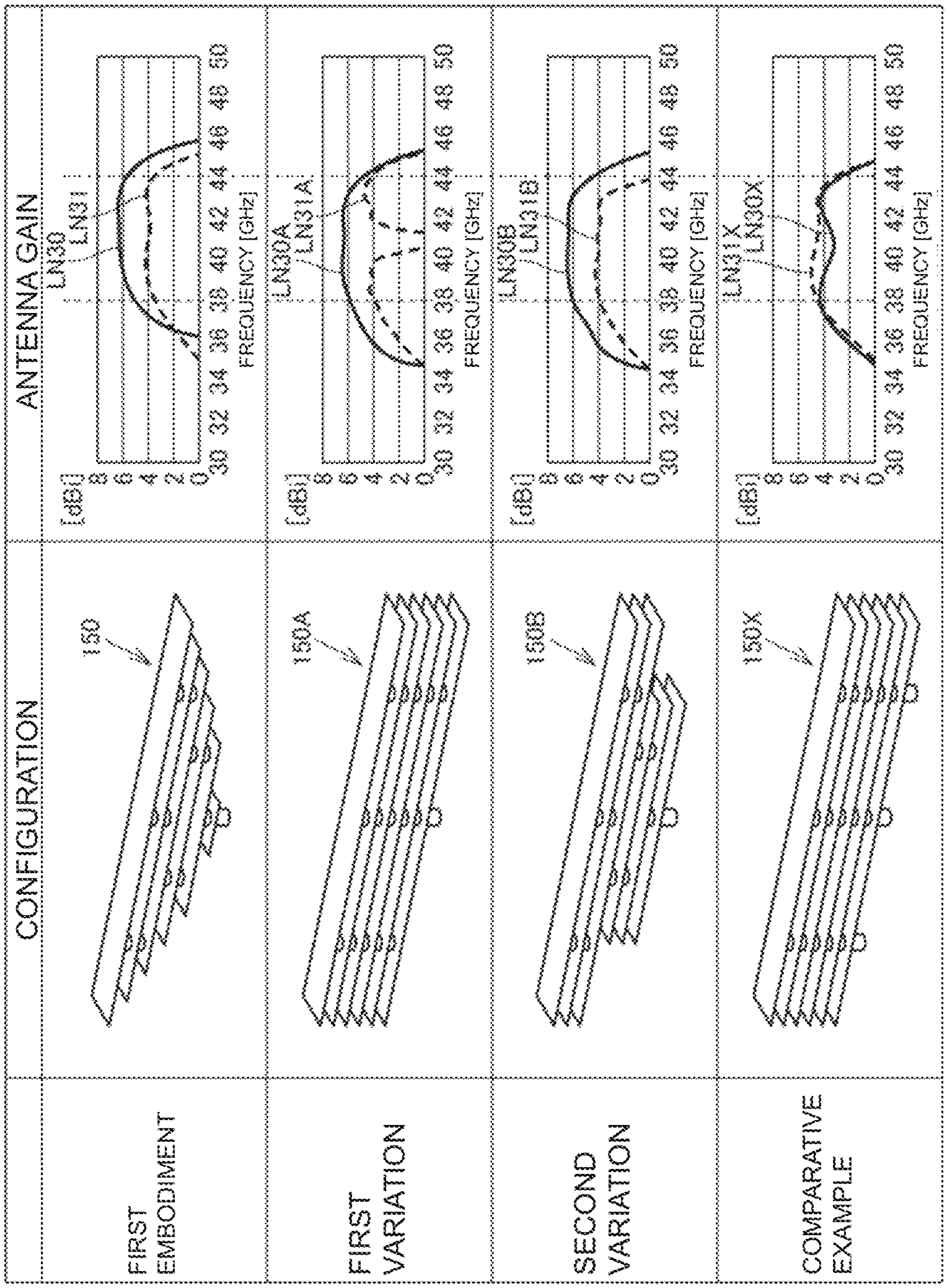
FIG. 12 is a diagram for describing how horizontally polarized waves are influenced by peripheral electrodes with different configurations in a dual polarization antenna module.

FIG. 12 is a diagram for describing how a horizontally polarized wave is influenced by peripheral electrodes with different configurations in a dual polarization antenna module. FIG. 12 shows antenna gains of the radiating element 121 for a vertically polarized wave and a horizontally polarized wave for each of cases in which the peripheral electrode 150 of the first exemplary embodiment, the peripheral electrode 150A of the first variation, the peripheral electrode 150B of the second variation, and the peripheral electrode 150X of the comparative example are used.

Referring to FIG. 12, for a vertically polarized wave, as described with reference to FIG. 4, the antenna gains (indicated by solid lines LN30, LN30A, and LN30B) in the target frequency band observed using the peripheral electrodes of the first exemplary embodiment, the first variation, and the second variation are greater than the antenna gain (indicated by a solid line LN30X) observed using the peripheral electrode of the comparative example. On the other hand, for a horizontally polarized wave, the antenna gains (indicated by dotted lines LN31, LN31A, and LN31B) observed using the peripheral electrodes of the first exemplary embodiment, the first variation, and the second variation are slightly and entirely less than the antenna gain (indicated by a dotted line LN31X) observed using the peripheral electrode of the comparative example. Furthermore, a local low gain region is present in each of the antenna gains observed in the target frequency band using the peripheral electrodes of the first variation and the second variations.

The peripheral electrode extends in the X-axis direction and is disposed parallel to the direction of horizontal polarization. Therefore, when a horizontally polarized wave is emitted, the peripheral electrode functions as a type of dipole antenna, and a component of a supplied radio frequency signal corresponding to the resonant frequency of the peripheral electrode propagates to the peripheral electrode due to resonance. As a result, the gain of the corresponding part of the resonant frequency decreases. Here, in the case of the peripheral electrode 150X of the comparative example, because the peripheral electrode simply functions as a ground electrode protruding in the Z-axis direction and does not function as a dipole antenna, such a low gain region is not present in the target frequency band of the radiating element 121.

As shown in FIG. 12, with the peripheral electrode 150A of the first variation in which all planar electrodes have the same length, a low gain region is observed near 41 GHz in the target frequency band (a dotted line LN31A). In the case of the peripheral electrode 150B of the second variation in which the lengths of planar electrodes are gradually decreased, compared to the peripheral electrode 150A, the resonant frequency of the peripheral electrode 150B increases as a result of reducing the lengths of some planar electrodes, and a low gain region is observed near 44 GHz (a dotted line LN31B). In the peripheral electrode 150 of the first exemplary embodiment having an inverted triangle shape, because the resonant frequency becomes higher than that of the peripheral electrode 150B of the second variation, a low gain region is observed near 45 GHz outside of the target frequency band (a dotted line LN31).

Thus, in the case of a dual polarization antenna module, it is necessary to consider the influence of antenna characteristics on horizontally polarized waves in addition to improving the antenna characteristics for vertically polarized waves.

In the example of FIG. 12, the local low gain region is improved with the peripheral electrode 150 having an inverted triangle shape. However, the frequency at which the low gain region is observed may also vary depending on the dimension in the Y-axis direction (width), the dimension in the Z-axis direction (thickness), and/or the shape of planar electrodes constituting a peripheral electrode. Therefore, the optimum configuration of a peripheral electrode is not necessarily an inverted triangle shape and needs to be appropriately determined depending on observed low gain regions.

"Radiating element 121" and "radiating element 122" in the first exemplary embodiment correspond to "first radiating element" and "second radiating element" in the present disclosure, respectively. Each of "peripheral electrodes 150 to 150E" in the first exemplary embodiment is an example of "first peripheral electrode" in the present disclosure. "Z-axis direction", "X-axis direction", and "Y-axis direction" in the first exemplary embodiment correspond to "first direction", "second direction", and "third direction" in the present disclosure, respectively.

Second Embodiment

In a second exemplary embodiment, in addition to the components in the first exemplary embodiment, peripheral electrodes for the radiating element 121 on the high frequency side are provided on the radiating element 122 on the low frequency side.

Figure 13:
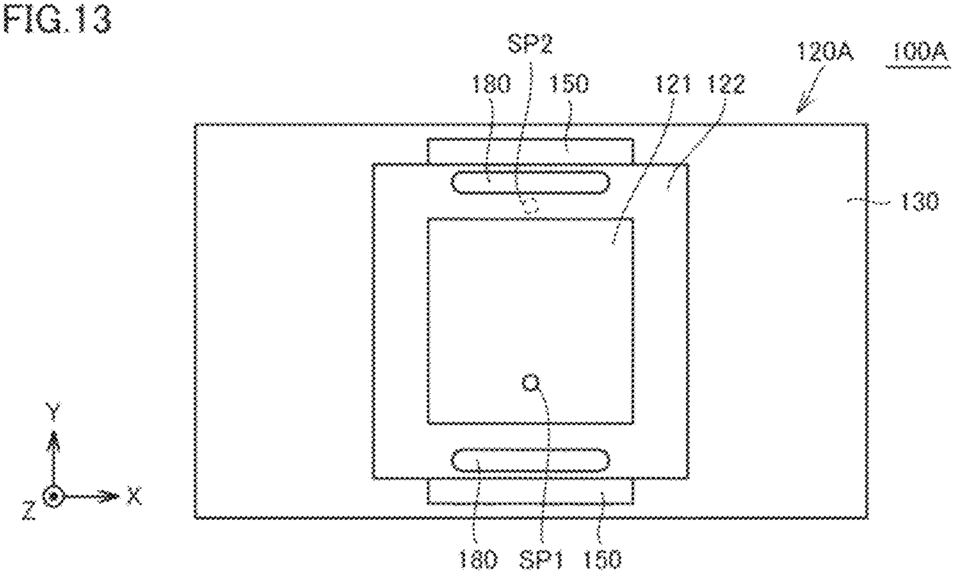
FIG. 13 is a plan view of an antenna module according to a second exemplary embodiment.
Figure 14:
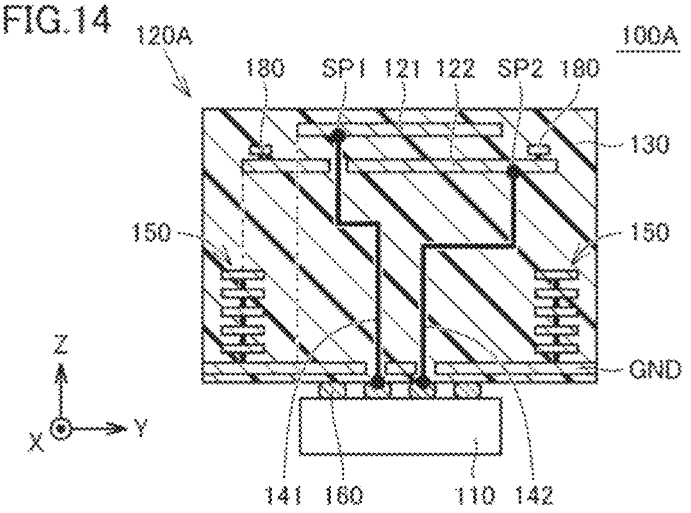
FIG. 14 is a side transparent view of the antenna module of FIG. 13 seen from the X-axis direction.

FIG. 13 is a plan view of an antenna module 100A according to the second exemplary embodiment. FIG. 14 is a side transparent view of the antenna module 100A seen from the X-axis direction. Here, descriptions of components of the antenna module 100A that are the same as those of the antenna module 100 of the first exemplary embodiment are not repeated.

Referring to FIGS. 13 and 14, in an antenna device 120A of the antenna module 100A, peripheral electrodes 180 are provided on the positive Y-axis end portion and the negative Y-axis end portion of the radiating element 122. Each peripheral electrode 180 includes at least one planar electrode extending in the X-axis direction and is electrically connected to the radiating element 122 through a via. In plan view from the normal direction of the dielectric substrate 130, the peripheral electrode 180 does not overlap the radiating element 121 and is disposed between a Y-axis end portion of the radiating element 121 and a Y-axis end portion of the radiating element 122.

As described above, the radiating element 122 serves as a virtual ground electrode for the radiating element 121, and the radiating element 121 emits radio waves as a result of electromagnetic field coupling with the radiating element 122. Therefore, when the size of the radiating element 122 is limited or when the difference between the resonant frequency of the radiating element 121 and the resonant frequency of the radiating element 122 is relatively small, the area of the radiating element 122 functioning as a ground electrode may become insufficient. In such a case, similarly to the peripheral electrodes 150 for the radiating element 122, providing the peripheral electrodes 180 on the radiating element 122 makes it possible to prevent a part of an electric field generated between the radiating element 121 and the radiating element 122 from going around to the back side of the radiating element 122 and thereby makes it possible to improve the antenna characteristics of the radiating element 121.

"Peripheral electrode 180" in the second exemplary embodiment corresponds to "second peripheral electrode" in the present disclosure.

Third Embodiment

In a third exemplary embodiment, each of the radiating elements 121 and 122 is a so-called dual polarization antenna module capable of emitting two radio waves with different polarization directions, and a peripheral electrode is provided for each polarization direction.

Figure 15:
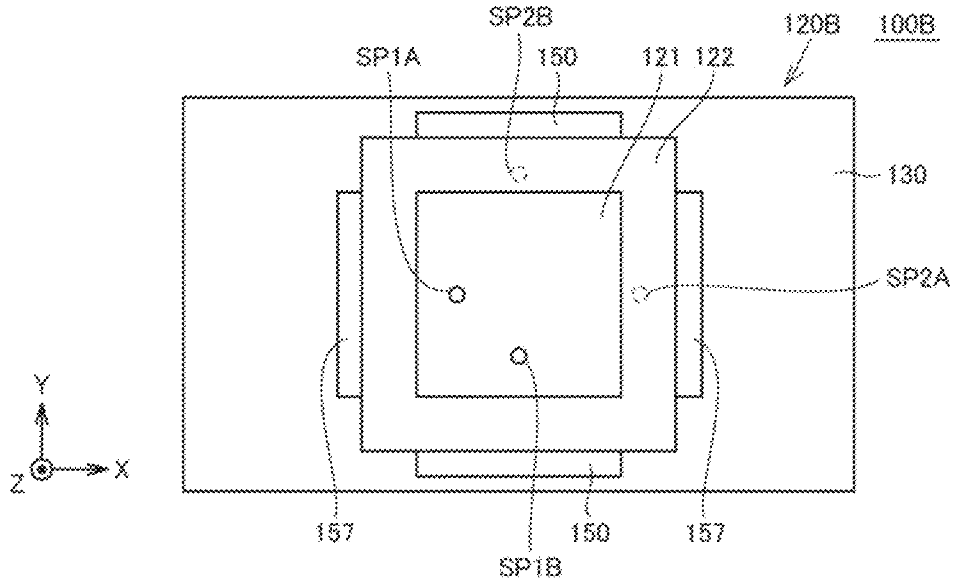
FIG. 15 is a plan view of an antenna module according to a third exemplary embodiment.

FIG. 15 is a plan view of an antenna module 100B according to the third exemplary embodiment. In an antenna device 120B of the antenna module 100B, each of the radiating elements 121 and 122 is capable of emitting a radio wave (horizontally polarized wave) with a polarization direction corresponding to the X-axis direction and a radio wave (vertically polarized wave) with a polarization direction corresponding to the Y-axis direction. Therefore, the radiating element 121 includes a feeding point SP1A for the horizontally polarized wave and a feeding point SP1B for the vertically polarized wave. Also, the radiating element 122 includes a feeding point SP2A for the horizontally polarized wave and a feeding point SP2B for the vertically polarized wave.

In the antenna module 100B, similarly to the first exemplary embodiment, the peripheral electrodes 150 are disposed at the end portions of the ground electrode GND in the Y-axis direction and extend along the X-axis direction.

Also, in the antenna module 100B, peripheral electrodes 157 are disposed at the end portions of the radiating element 122 in the X-axis direction and extend along the Y-axis direction. Although not shown in FIG. 15, each peripheral electrode 157 has the same configuration as the peripheral electrode 150 and includes multiple planar electrodes that extend in the Y-axis direction and are stacked in the Z-axis direction. The multiple planar electrodes are electrically connected to the ground electrode GND through vias, and the peripheral electrode 157 as a whole has an inverted triangle shape in a view of the dielectric substrate 130 from the X-axis direction.

In a dual polarization and dual-band antenna module, the antenna characteristics of the radiating element 121 for respective polarized waves can be improved by providing peripheral electrodes corresponding to the polarized waves.

"Peripheral electrode 157" in the third exemplary embodiment corresponds to "fourth peripheral electrode" in the present disclosure.

Fourth Embodiment

In the configurations according to the first through third exemplary embodiments, a pair of radiating elements 121 and 122 stacked in the normal direction of the dielectric substrate 130 are provided in or on the dielectric substrate 130. In a fourth exemplary embodiment, multiple pairs of radiating elements 121 and 122 are arranged in or on the dielectric substrate 130 to form an array antenna.

Figure 16:
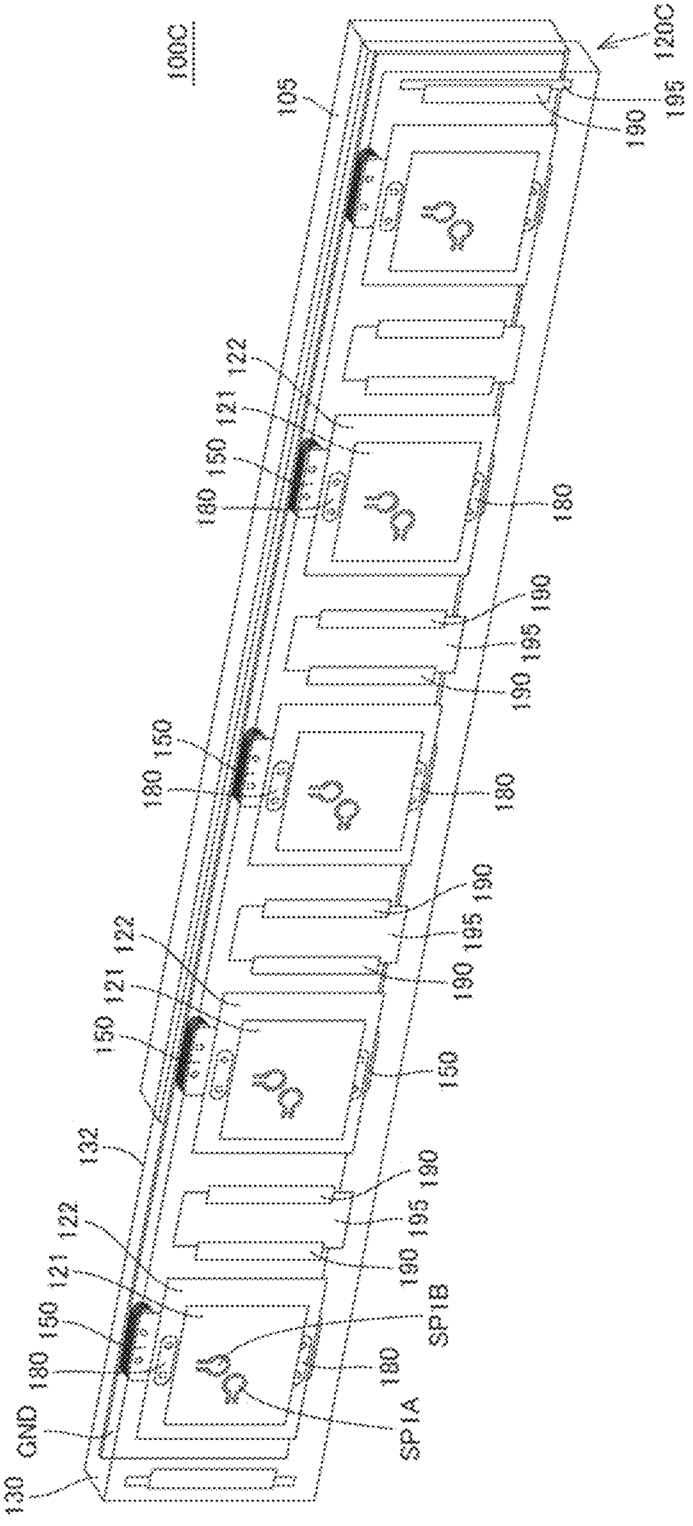
FIG. 16 is a perspective view of an antenna module according to a fourth exemplary embodiment.

FIG. 16 is a perspective view of an antenna module 100C according to the fourth exemplary embodiment. An antenna device 120C of the antenna module 100C has a configuration of a one-dimensional array in which five pairs of radiating elements 121 and 122 are arranged in a row in the X-axis direction in or on the dielectric substrate 130. A circuit board 105 including the RFIC 110 and other circuits is disposed on the lower surface 132 of the dielectric substrate 130.

Each pair of radiating elements 121 and 122 have the same configuration as that of the second exemplary embodiment, and the peripheral electrodes 150 are disposed at the end portions of the ground electrode GND in the Y-axis direction. Also, the peripheral electrodes 180 are disposed at the end portions of the radiating element 122 in the Y-axis direction.

The antenna module 100C is a dual polarization antenna module including radiating elements capable of emitting radio waves (horizontally polarized waves) with a polarization direction corresponding to the X-axis direction as) and radio waves (vertically polarized waves) with a polarization direction corresponding to the Y-axis direction. Therefore, each radiating element 121 includes the feeding point SP1A for the horizontally polarized wave and the feeding point SP1B for the vertically polarized wave. Also, each radiating element 122 includes a feeding point for the horizontally polarized wave and a feeding point for the vertically polarized wave, although these feeding points are hidden by the radiating element 121 in FIG. 16.

Also, in the antenna module 100C, parasitic elements 190 and 195 extending in the Y-axis direction are arranged at intervals in the X-axis direction for respective radiating elements. More specifically, parasitic elements 190 are disposed in the positive and negative X-axis directions with respect to each radiating element 121. Also, parasitic elements 195 are disposed in the positive and negative X-axis directions with respect to each radiating element 122. Here, one parasitic element 195 is disposed between and shared by adjacent radiating elements 122.

The parasitic elements 190 are disposed in the same layer as the radiating elements 121 in the dielectric substrate 130. The dimension of each parasitic element 190 in the Y-axis direction is set to a value that is substantially the same as the dimension of each side of the radiating element 121. Similarly, the parasitic elements 195 are disposed in the same layer as the radiating elements 122 in the dielectric substrate 130. The dimension of each parasitic element 195 in the Y-axis direction is set to a value that is substantially the same as the dimension of each side of the radiating element 122. Providing the parasitic elements 190 and 195 makes it possible to expand the frequency bands of the radiating elements.

Even in the case of a dual-band array antenna as described above, when the size of a ground electrode relative to radiating elements is limited for the purpose of miniaturization, the deterioration of antenna characteristics of a radiating element on the low frequency side can be suppressed by disposing peripheral electrodes orthogonal to the polarization direction. Also, the antenna characteristics of a radiating element on the high frequency side can be improved by adjusting the dimensions and the shape of the peripheral electrodes.

In the fourth exemplary embodiment, one of the adjacent radiating elements 121 on the high frequency side corresponds to "first radiating element" of the present disclosure, and the other one of the adjacent radiating elements 121 corresponds to “third radiating element” of the present disclosure. In the fourth exemplary embodiment, one of the adjacent radiating elements 122 on the low frequency side corresponds to “second radiating element” of the present disclosure, and the other one of the adjacent radiating elements 122 corresponds to “fourth radiating element” of the present disclosure. “Parasitic element 190” and “parasitic element 195” in the fourth exemplary embodiment correspond to “first parasitic element” and “second parasitic element” of the present disclosure. In the fourth exemplary embodiment, the peripheral electrode 150 provided for the first radiating element corresponds to “first peripheral electrode” of the present disclosure, and the peripheral electrode 150 provided for the third radiating element corresponds to “third peripheral electrode” of the present disclosure.

Fifth Embodiment

In the configurations described in the first through fourth exemplary embodiments, radio waves with polarization directions along the sides of a rectangular dielectric substrate are emitted. In a fifth exemplary embodiment, the features of peripheral electrodes of the present disclosure are applied to an antenna module that emits radio waves with polarization directions that are diagonal to the sides of a dielectric substrate.

Figure 17:
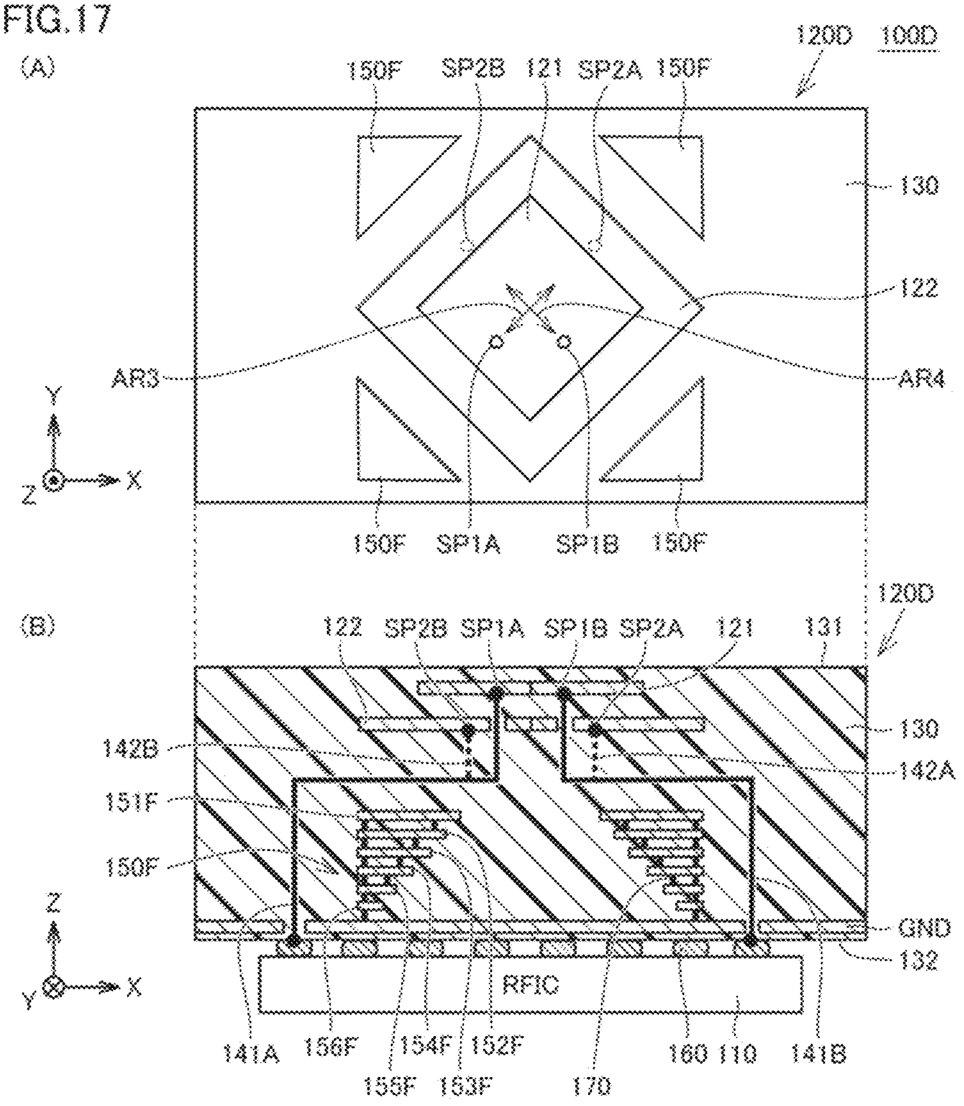
FIG. 17 is a plan view and a side transparent view of an antenna module according to a fifth exemplary embodiment.

FIG. 17 is a plan view and a side transparent view of an antenna module 100D according to the fifth exemplary embodiment. Similarly to the antenna module 100B illustrated in FIG. 15, an antenna device 120D of the antenna module 100D is a dual polarization antenna module that can emit radio waves with two different polarization directions. In the antenna module 100D, peripheral electrodes 150F are provided instead of the peripheral electrodes 150 and 157 illustrated in FIG. 15. Also, feeding wires 141A, 141B, 142A, and 142B for transmitting radio frequency signals to corresponding feeding points SP1A, SP1B, SP2A, and SP2B are provided in the dielectric substrate 130. Descriptions of components in FIG. 17 that are the same as those in FIG. 2 or FIG. 15 are not repeated.

Referring to FIG. 17, in the antenna module 100D, the radiating elements 121 and 122 with a substantially square shape are disposed such that the sides of the radiating elements 121 and 122 are inclined with respect to the sides (i.e., the X-axis and the Y-axis) of the dielectric substrate 130. More specifically, the radiating elements 121 and 122 are disposed such that the sides of the radiating elements 121 and 122 are inclined at 45° with respect to the sides of the dielectric substrate 130. However, the inclination angle is not limited to 45° and may be any angle greater than 0° and less than 90°.

In the radiating element 121, the feeding point SP1A is disposed at a position that is offset from the center of the radiating element 121 in the negative X-axis direction and the negative Y-axis direction, and the feeding point SP1B is disposed at a position that is offset from the center of the radiating element 121 in the positive X-axis direction and the negative Y-axis direction. In the radiating element 122, the feeding point SP2A is disposed at a position that is offset from the center of the radiating element 122 in the positive X-axis direction and the positive Y-axis direction, and the feeding point SP2B is disposed at a position that is offset from the center of the radiating element 122 in the negative X-axis direction and the positive Y-axis direction.

Accordingly, when radio frequency signals are supplied to the feeding points SP1A and SP2A, radio waves with a polarization direction that is 45° from the X-axis toward the Y-axis (an arrow AR3) are emitted from the radiating elements 121 and 122. Also, when radio frequency signals are supplied to the feeding points SP1B and SP2B, radio waves with a polarization direction that is −45° from the X-axis toward the Y-axis (an arrow AR4) are emitted from the radiating elements 121 and 122. In other words, the polarization directions of radio waves emitted from the radiating elements are inclined with respect to the sides of the dielectric substrate 130.

The peripheral electrodes 150F are disposed to face the corresponding sides of the radiating elements 121 and 122. Each peripheral electrode 150F includes multiple planar electrodes. In plan view from the normal direction of the dielectric substrate 130, each planar electrode of the peripheral electrode 150F is shaped like a triangle and is disposed such that the hypotenuse of the triangle faces the radiating elements. Also, the extension direction (fifth direction) of the hypotenuse of each planar electrode is orthogonal to the polarization direction (sixth direction) of the radiating elements.

In the example of FIG. 17, each peripheral electrode 150F includes six planar electrodes 151F to 156F. The planar electrodes 151F to 156F are stacked from the upper surface 131 toward the lower surface 132 of the dielectric substrate 130. The planar electrodes 151F to 156F have similar shapes, and the sizes of the planar electrodes 151F to 156F decrease toward the lower surface 132. For example, the length of the hypotenuse of the planar electrode 151F is greater than the length of the hypotenuse of the planar electrode 152F. Similarly, the length of the hypotenuse of the planar electrode 152F is greater than the length of the hypotenuse of the planar electrode 153F. The planar electrodes 151F to 156F are connected to each other and also connected to the ground electrode GND through multiple vias 170.

The length of the hypotenuse of the planar electrode 151F is substantially the same as the length of the side of the radiating element 121 facing the hypotenuse.

Figure 18:
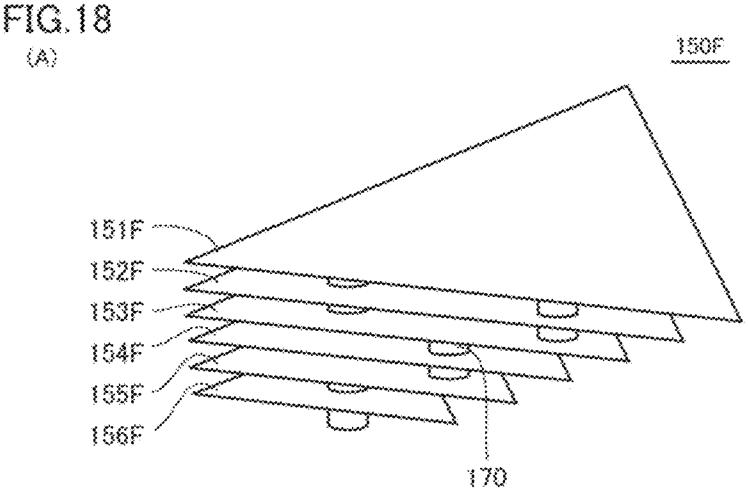
FIG. 18 is a diagram illustrating the configuration of a peripheral electrode according to the fifth exemplary embodiment.
Figure 18:
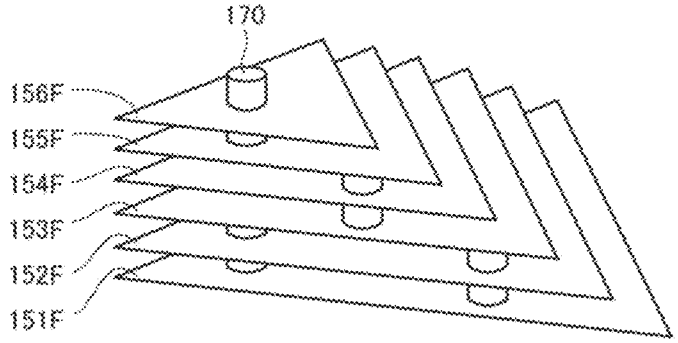

FIG. 18 is a diagram illustrating the configuration of the peripheral electrode 150F. The upper part (A) of FIG. 18 is a perspective view of the peripheral electrode 150F seen from the upper surface 131, and the lower part (B) of FIG. 18 is a perspective view of the peripheral electrode 150F seen from the lower surface 132. In the peripheral electrode 150F, in plan view of the dielectric substrate 130 from the normal direction, the planar electrodes are arranged such that the vertices facing the hypotenuses of the planar electrodes overlap each other.

With this configuration of the peripheral electrode 150F, the peripheral electrode 150F can function as a dielectric resonator similarly to the peripheral electrode 150 of the first exemplary embodiment. Also, it is possible to generate a pole near the frequency band of the radiating element 121 by adjusting the dimension of the hypotenuse of the planar electrode 151F to correspond to the radiating element 121. This makes it possible to improve the antenna characteristics of the radiating element 121.

Figure 19:
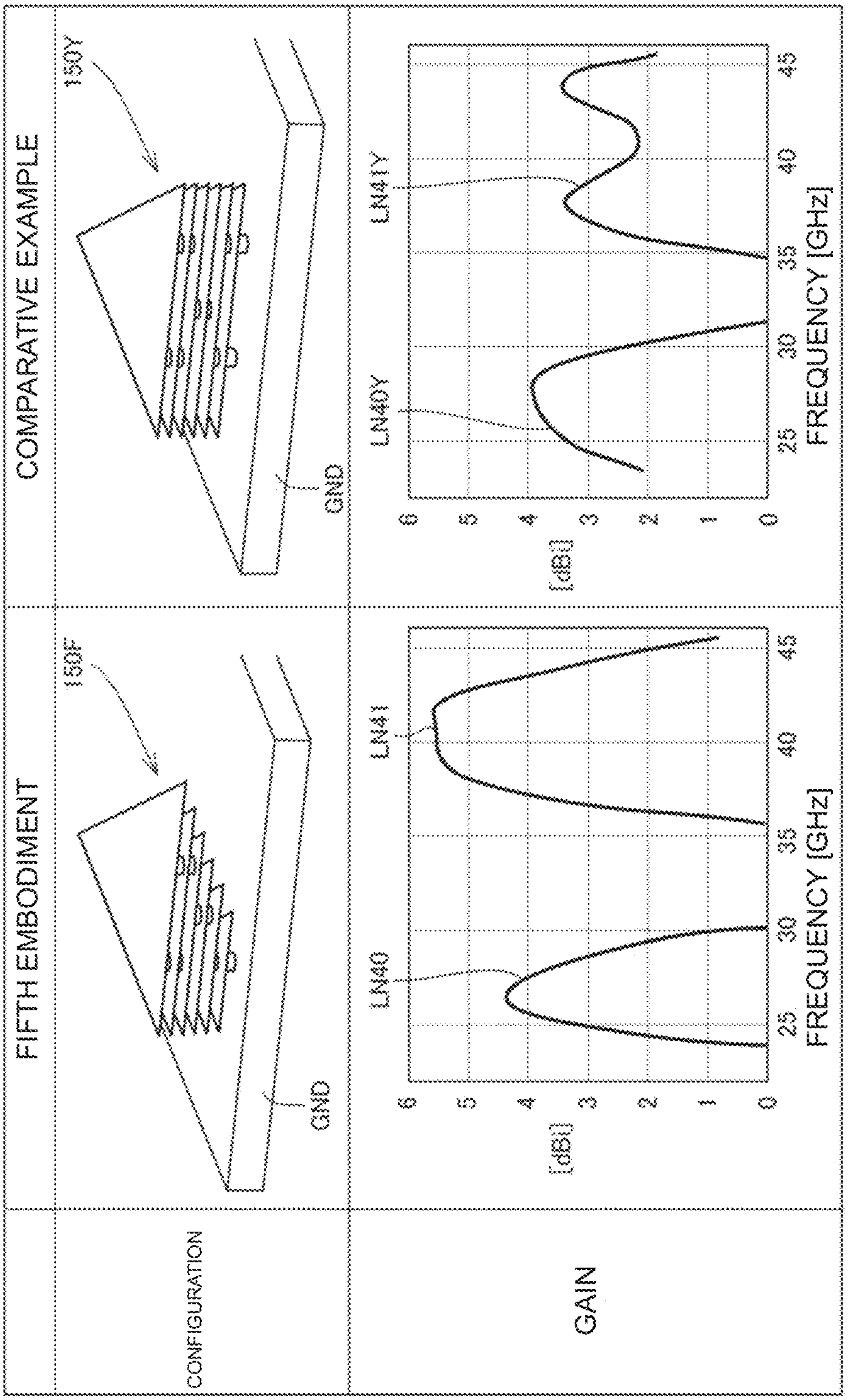
FIG. 19 is a diagram for describing the gain characteristics of the antenna module according to the fifth exemplary embodiment.

Next, the antenna characteristics of the antenna module 100D are described with reference to FIG. 19. FIG. 19 is a diagram for describing the gain characteristics of the antenna module 100D of the fifth exemplary embodiment. In FIG. 19, the left column corresponds to the peripheral electrode 150F, and the right column corresponds to a peripheral electrode 150Y of a comparative example in which all planar electrodes have the same size. In FIG. 19, the upper row includes schematic diagrams of peripheral electrodes, and the lower row shows the antenna gains of the radiating elements 121 and 122. In graphs showing gain characteristics, lines LN40 and LN40Y indicate the gains of the radiating element 122 on the low frequency side, and lines LN41 and LN41Y indicate the gains of the radiating element 121 on the high frequency side.

As shown in FIG. 19, the gain characteristics, in terms of both peak gain and band width, of the radiating element 121 in the fifth exemplary embodiment are significantly better than those in the comparative example. Also, regarding the gain characteristics of the radiating element 122, although the band width is slightly narrower, the peak gain in the fifth exemplary embodiment is greater than the peak gain in the comparative example.

As described above, even in an antenna module that emits radio waves with polarization directions inclined with respect to the sides of a dielectric substrate, it is possible to improve the antenna characteristics of a radiating element on the high frequency side by providing peripheral electrodes extending in directions orthogonal to the polarization directions and decreasing the sizes of multiple planar electrodes constituting each of the peripheral electrodes toward a ground electrode. This makes it possible to improve the antenna characteristics of a dual-band antenna module while reducing the size of the entire antenna module.

Sixth Variation

Figure 20:
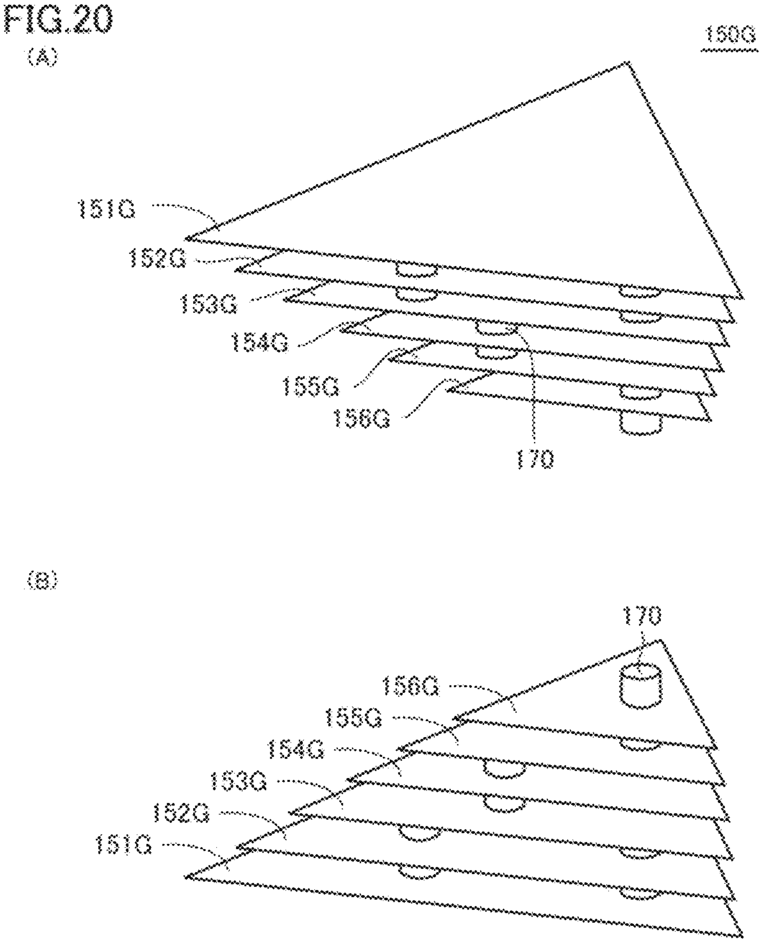
FIG. 20 is a diagram illustrating the configuration of a peripheral electrode according to a sixth variation.

FIG. 20 is a perspective view illustrating the configuration of a peripheral electrode 150G of a sixth variation. The upper part (A) of FIG. 20 is a perspective view of the peripheral electrode 150G seen from the upper surface 131, and the lower part (B) is a perspective view of the peripheral electrode 150G seen from the lower surface 132. Similarly to the peripheral electrode 150F of the fifth exemplary embodiment, the peripheral electrode 150G includes multiple planar electrodes 151G to 156G that have similar triangular shapes and are connected to each other through vias 170.

The planar electrodes 151G to 156G are stacked from the upper surface 131 toward the lower surface 132 of the dielectric substrate 130, and the sizes of the planar electrodes 151G to 156G decrease toward the lower surface 132. Also, in the peripheral electrode 150G, in plan view of the dielectric substrate 130 from the normal direction, the planar electrodes 151G to 156G are arranged such that the hypotenuses of the planar electrodes 151G to 156G facing the radiating elements overlap each other.

Figure 21:
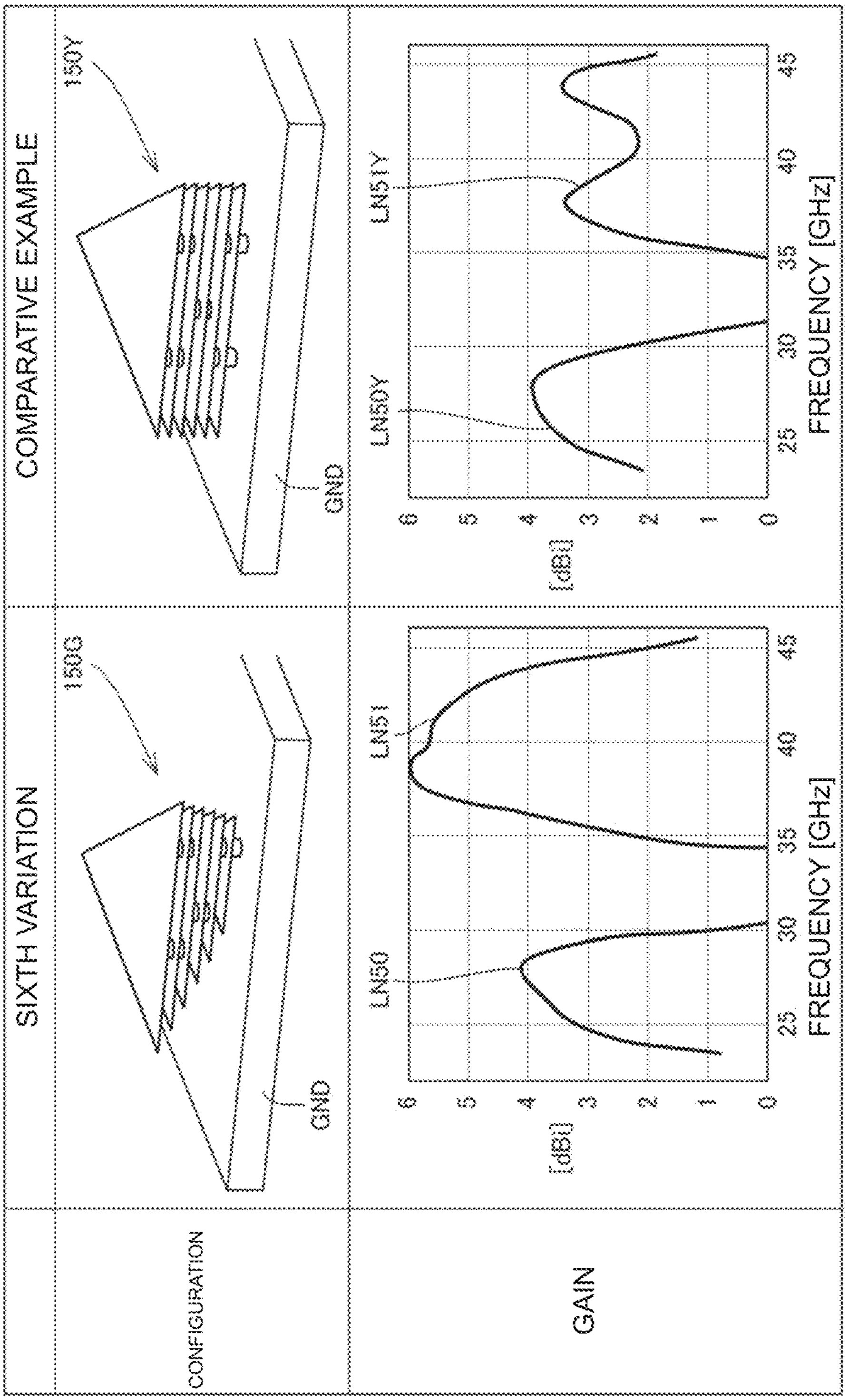
FIG. 21 is a diagram for describing the gain characteristics of an antenna module using the peripheral electrode of the sixth variation.

FIG. 21 is a diagram for describing the gain characteristics of an antenna module using the peripheral electrode 150G of the sixth variation. In FIG. 21, similarly to FIG. 19 described in the fifth exemplary embodiment, the upper row includes schematic diagrams of peripheral electrodes, and the lower row shows the antenna gains of the radiating elements 121 and 122. Also, in FIG. 21, the left column corresponds to the peripheral electrode 150G, and the right column corresponds to the peripheral electrode 150Y of the comparative example in which all planar electrodes have the same size. In graphs showing gain characteristics, lines LN50 and LN50Y indicate the gains of the radiating element 122 on the low frequency side, and lines LN51 and LN51Y indicate the gains of the radiating element 121 on the high frequency side.

As shown in FIG. 21, even in the case of the peripheral electrode 150G, the gain characteristics, in terms of both peak gain and band width, of the radiating element 121 in the sixth variation are significantly better than those in the comparative example. Also, regarding the gain characteristics of the radiating element 122, the peak gain in the sixth variation is greater than that in the comparative example.

As described above, the antenna characteristics of a radiating element on the high frequency side can be improved by using peripheral electrodes with a configuration as described in the sixth variation. This in turn makes it possible to improve the antenna characteristics of a dual-band antenna module while reducing the size of the entire antenna module.

Seventh Variation

Figure 22:
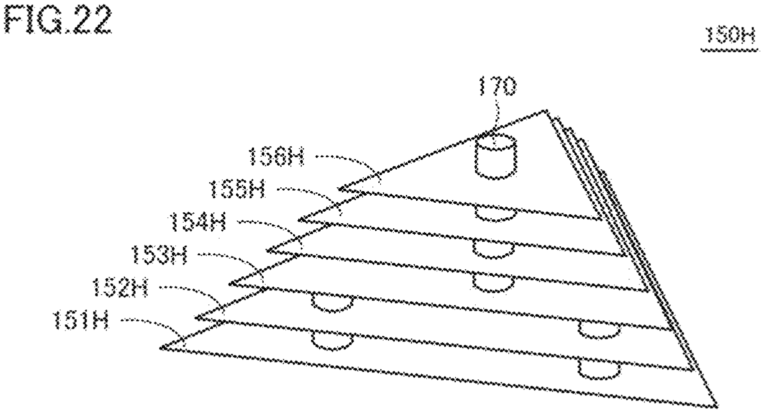
FIG. 22 is a diagram illustrating the configuration of a peripheral electrode according to a seventh variation.

In a seventh variation, another example of the arrangement of multiple planar electrodes constituting a peripheral electrode is described. FIG. 22 is a perspective view illustrating the configuration of a peripheral electrode 150H of the seventh variation. FIG. 22 is a perspective view of the peripheral electrode 150H seen from the lower surface 132.

Similarly to the peripheral electrode 150F of the fifth exemplary embodiment, the peripheral electrode 150H includes multiple planar electrodes 151H to 156H that have similar triangular shapes and are connected to each other through vias 170. The planar electrodes 151H to 156H are stacked from the upper surface 131 toward the lower surface 132 of the dielectric substrate 130, and the sizes of the planar electrodes 151H to 156H decrease toward the lower surface 132. Also, in the peripheral electrode 150H, in plan view of the dielectric substrate 130 from the normal direction, the planar electrodes 151H to 156H are arranged such that the centroids of the planar electrodes 151H to 156H overlap each other.

Even with this arrangement of the planar electrodes 151H to 156H, the peripheral electrode 150H can function as a dielectric resonator and can therefore improve the antenna characteristics of the radiating element 121.

Eighth Variation

In the examples described in the fifth exemplary embodiment and the sixth and seventh variations, planar electrodes constituting a peripheral electrode have triangular shapes. However, the planar electrodes may have any other shapes as long as they are similar to each other.

Figure 23:
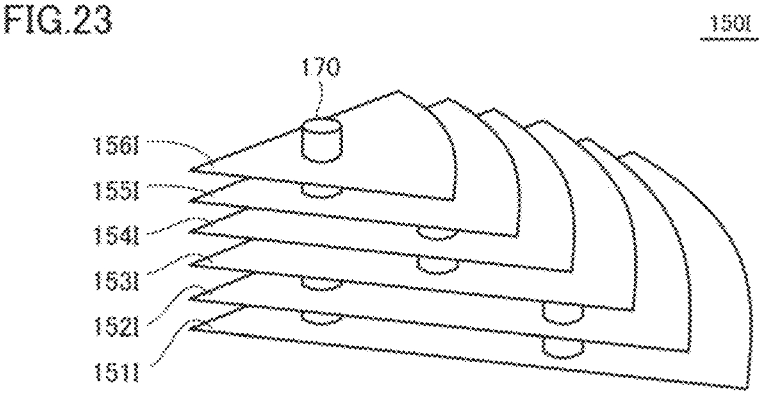
FIG. 23 is a diagram illustrating the configuration of a peripheral electrode according to an eighth variation.

FIG. 23 is a perspective view illustrating the configuration of a peripheral electrode 150I of an eighth variation. FIG. 23 is a perspective view of the peripheral electrode 150I seen from the lower surface 132.

In the eighth variation, in plan view of the dielectric substrate 130 from the normal direction, the planar electrodes 151I to 156I constituting the peripheral electrode 150I have fan shapes that are similar to each other and are arranged such that the arcs of the fan shapes face the radiating element 121. The planar electrodes 151I to 156I are stacked from the upper surface 131 toward the lower surface 132 of the dielectric substrate 130, and the sizes of the planar electrodes 151I to 156I decrease toward the lower surface 132. Also, in the peripheral electrode 150I, in plan view of the dielectric substrate 130 from the normal direction, the planar electrodes 151I to 156I are arranged such that the centers of the fan shapes overlap each other.

Even with this arrangement of the planar electrodes 151I to 156I with fan shapes, the peripheral electrode 150I can function as a dielectric resonator and therefore can improve the antenna characteristics of the radiating element 121.

Aspects (Paragraph 1) An antenna module includes a dielectric substrate, a ground electrode disposed in the dielectric substrate, a first radiating element, a second radiating element, and a first peripheral electrode. The first radiating element is disposed to face the ground electrode. The second radiating element is disposed between the first radiating element and the ground electrode. The first peripheral electrode is disposed in a layer of the dielectric substrate between the ground electrode and the second radiating element and is electrically connected to the ground electrode. The first radiating element and the second radiating element have a planar shape. The first radiating element is configured to emit a radio wave in a first frequency band. The second radiating element is configured to emit a radio wave in a second frequency band that is lower than the first frequency band. The first peripheral electrode includes multiple planar electrodes that are stacked in a first direction in which the first radiating element faces the ground electrode. The multiple planar electrodes include a first electrode and a second electrode disposed in a layer between the first electrode and the ground electrode. The size of the second electrode is less than the size of the first electrode.

(Paragraph 2) In the antenna module described in paragraph 1, the multiple planar electrodes further include a third electrode disposed in a layer between the second electrode and the ground electrode. The size of the third electrode is less than the size of the second electrode.

(Paragraph 3) In the antenna module described in paragraph 1, the multiple planar electrodes are strip-shaped electrodes extending in a second direction. The length of the second electrode in the second direction is less than the length of the first electrode in the second direction.

(Paragraph 4) In the antenna module described in paragraph 3, the lengths of the multiple planar electrodes in the second direction decrease toward the ground electrode.

(Paragraph 5) In the antenna module described in paragraph 3 or 4, the first radiating element is configured to emit the radio wave with a polarization direction corresponding to a third direction that is orthogonal to the second direction.

(Paragraph 6) In the antenna module described in paragraph 5, the first peripheral electrode is provided for each of end portions of the first radiating element in the third direction.

(Paragraph 7) In the antenna module described in paragraph 5 or 6, the dimension of the dielectric substrate in the third direction is less than the dimension of the dielectric substrate in the second direction.

(Paragraph 8) In the antenna module described in any one of paragraphs 1 to 7, the first peripheral electrode further includes a via that connects the multiple planar electrodes to the ground electrode and a via that connects the multiple planar electrodes to each other.

(Paragraph 9) In the antenna module described in any one of paragraphs 1 to 7, the multiple planar electrodes include electrodes that are capacitively coupled with each other.

(Paragraph 10) In the antenna module described in any one of paragraphs 3 to 7, among the multiple planar electrodes, the length of the longest electrode in the second direction is within ±25% of the dimension of the first radiating element in the second direction.

(Paragraph 11) In the antenna module described in any one of paragraphs 1 to 10, in plan view from the first direction, the first peripheral electrode does not overlap the first radiating element.

(Paragraph 12) In the antenna module described in paragraph 11, in plan view from the first direction, at least a part of the first peripheral electrode overlaps the second radiating element.

(Paragraph 13) In the antenna module described in any one of paragraphs 3 to 7, the first radiating element is configured to further emit a radio wave with a polarization direction corresponding to the second direction.

(Paragraph 14) The antenna module described in any one of paragraphs 3 to 7 further includes a second peripheral electrode disposed on the second radiating element and extending in the second direction. The second peripheral electrode is electrically connected to the second radiating element.

(Paragraph 15) The antenna module described in any one of paragraphs 3 to 7 further includes a third radiating element, a fourth radiating element, and a third peripheral electrode. The third radiating element is disposed adjacent to the first radiating element and is configured to emit a radio wave in the first frequency band. The fourth radiating element is disposed between the third radiating element and the ground electrode and is configured to emit a radio wave in the second frequency band. The third peripheral electrode is disposed in a layer of the dielectric substrate between the ground electrode and the fourth radiating element and is electrically connected to the ground electrode. The third peripheral electrode includes a fourth electrode and a fifth electrode that are stacked in the first direction and extend in the second direction. The fifth electrode is disposed in a layer between the fourth electrode and the ground electrode. The length of the fifth electrode in the second direction is less than the length of the fourth electrode in the second direction.

(Paragraph 16) The antenna module described in paragraph 15 further includes a first parasitic element disposed between the first radiating element and the third radiating element.

(Paragraph 17) The antenna module described in paragraph 15 or 16 further includes a second parasitic element disposed between the second radiating element and the fourth radiating element.

(Paragraph 18) The antenna module described in paragraph 13 further includes a fourth peripheral electrode that is disposed in a layer of the dielectric substrate between the ground electrode and the second radiating element and is electrically connected to the ground electrode. The fourth peripheral electrode includes a sixth electrode and a seventh electrode that are stacked in the first direction and extend in a fourth direction intersecting the second direction. The seventh electrode is disposed in a layer between the sixth electrode and the ground electrode. The length of the seventh electrode in the fourth direction is less than the length of the sixth electrode in the fourth direction.

(Paragraph 19) In the antenna module described in paragraph 1, the multiple planar electrodes have similar shapes.

(Paragraph 20) In the antenna module described in paragraph 19, each of the multiple planar electrodes is shaped like a triangle and is disposed such that the hypotenuse of the triangle faces the first radiating element. The length of the hypotenuse of the second electrode is less than the length of the hypotenuse of the first electrode.

(Paragraph 21) In the antenna module described in paragraph 20, in plan view of the dielectric substrate from the normal direction, the multiple planar electrodes are arranged such that the vertices facing the hypotenuses of the planar electrodes overlap each other.

(Paragraph 22) In the antenna module described in paragraph 20, in plan view of the dielectric substrate from the normal direction, the multiple planar electrodes are arranged such the hypotenuses overlap each other.

(Paragraph 23) In the antenna module described in paragraph 20, in plan view of the dielectric substrate from the normal direction, the multiple planar electrodes are arranged such that the centroids of the multiple planar electrodes overlap each other.

(Paragraph 24) In the antenna module described in any one of paragraphs 20 to 23, when a fifth direction indicates the direction in which the hypotenuse of each of the multiple planar electrodes extends, the first radiating element is configured to emit a radio wave with a polarization direction corresponding to a sixth direction that is orthogonal to the fifth direction.

(Paragraph 25) In the antenna module described in paragraph 19, in plan view of the dielectric substrate from the normal direction, the multiple planar electrodes have fan shapes and are arranged such that the arcs of the fan shapes face the first radiating element. In plan view of the dielectric substrate from the normal direction, the multiple planar electrodes are arranged such that the centers of the fan shapes overlap each other.

(Paragraph 26) In the antenna module described in any one of paragraphs 19 to 25, the dielectric substrate has a substantially rectangular shape. The angle formed between the polarization direction of the first radiating element and each side of the dielectric substrate is greater than 0° and less than 90°.

(Paragraph 27) The antenna module described in any one of paragraphs 1 to 26 further includes a feed circuit configured to supply a radio frequency signal to each of the radiating elements.

(Paragraph 28) A communication apparatus including the antenna module described in any one of paragraphs 1 to 27.

The above-disclosed exemplary embodiments should be considered as examples and not restrictive in all respects. The scope of the present disclosure is defined by the scope of the claims rather than by the above descriptions of the exemplary embodiments and is intended to include all modifications within the scope of the claims and the meaning and scope of equivalents.

REFERENCE SIGNS LIST

10 communication apparatus; 100, 100A to 100D antenna module; 105 circuit board; 110 RFIC; 111A to 111H, 113A to 113H, 117A, 117B switch; 112AR to 112HR low noise amplifier; 112AT to 112HT power amplifier; 114A to 114H attenuator; 115A to 115H phase shifter; 116A, 116B signal combiner/splitter; 118A, 118B mixer; 119A, 119B amplifier circuit; 120, 120A to 120D antenna device; 121, 122 radiating element; 130 dielectric substrate; 141, 142 feeding wire; 150, 150A to 150I, 150X, 150Y, 157, 180 peripheral electrode; 151 to 156, 151F to 156F, 151G to 156G, 151H to 156H, 151I to 156I planar electrode; 160 solder bump; 170 via; 190, 195 parasitic element; 200 BBIC; GND ground electrode; SP1, SP1A, SP1B, SP2, SP2A, SP2B feeding point

The invention claimed is:

1. An antenna module comprising:
a dielectric substrate;
a ground electrode disposed in the dielectric substrate;
a first radiating element disposed to face the ground electrode;
a second radiating element disposed between the first radiating element and the ground electrode; and
a first peripheral electrode disposed in a layer of the dielectric substrate between the ground electrode and the second radiating element and electrically connected to the ground electrode, wherein
the first radiating element and the second radiating element have a planar shape,
the first radiating element is configured to emit a first radio wave in a first frequency band,
the second radiating element is configured to emit a second radio wave in a second frequency band that is lower than the first frequency band,
the first peripheral electrode includes multiple planar electrodes that are stacked in a first direction in which the first radiating element faces the ground electrode,
the multiple planar electrodes include a first electrode and a second electrode disposed in a layer between the first electrode and the ground electrode, and
a size of the second electrode is less than a size of the first electrode.

2. The antenna module according to claim 1, wherein
the multiple planar electrodes further include a third electrode disposed in a layer between the second electrode and the ground electrode, and
a size of the third electrode is less than the size of the second electrode.

3. The antenna module according to claim 1, wherein
the multiple planar electrodes are strip-shaped electrodes extending in a second direction, and
a length of the second electrode in the second direction is less than a length of the first electrode in the second direction.

4. The antenna module according to claim 3, wherein
lengths of the multiple planar electrodes in the second direction decrease toward the ground electrode.

5. The antenna module according to claim 3, wherein
the first radiating element is configured to emit a first radio wave with a polarization direction corresponding to a third direction that is orthogonal to the second direction.

6. The antenna module according to claim 5, wherein
the first peripheral electrode is provided for each of end portions of the first radiating element in the third direction.

7. The antenna module according to claim 5, wherein
a dimension of the dielectric substrate in the third direction is less than a dimension of the dielectric substrate in the second direction.

8. The antenna module according to claim 3, wherein
among the multiple planar electrodes, a length of a longest electrode in the second direction is within ±25% of a dimension of the first radiating element in the second direction.

9. The antenna module according to claim 3, wherein
the first radiating element is configured to further emit a radio wave with a polarization direction corresponding to the second direction.

10. The antenna module according to claim 3, further comprising:
a second peripheral electrode disposed on the second radiating element and extending in the second direction, and
the second peripheral electrode is electrically connected to the second radiating element.

11. The antenna module according to claim 3, further comprising:
a third radiating element disposed adjacent to the first radiating element and configured to emit a radio wave in the first frequency band;

a fourth radiating element disposed between the third radiating element and the ground electrode and configured to emit a radio wave in the second frequency band; and a third peripheral electrode that is disposed in a layer of the dielectric substrate between the ground electrode and the fourth radiating element and is electrically connected to the ground electrode, wherein the third peripheral electrode includes a fourth electrode and a fifth electrode that are stacked in the first direction and extend in the second direction, the fifth electrode is disposed in a layer between the fourth electrode and the ground electrode, and a length of the fifth electrode in the second direction is less than a length of the fourth electrode in the second direction.

12. The antenna module according to claim 11, further comprising:

a first parasitic element disposed between the first radiating element and the third radiating element.

13. The antenna module according to claim 11, further comprising:

a second parasitic element disposed between the second radiating element and the fourth radiating element.

14. The antenna module according to claim 1, wherein the first peripheral electrode further includes a first via that connects the multiple planar electrodes to the ground electrode and a second via that interconnects the multiple planar electrodes.

15. The antenna module according to claim 1, wherein the multiple planar electrodes include capacitively coupled electrodes.

16. The antenna module according to claim 1, wherein in plan view from the first direction, the first peripheral electrode does not overlap the first radiating element.

17. The antenna module according to claim 16, wherein in plan view from the first direction, at least a part of the first peripheral electrode overlaps the second radiating element.

18. The antenna module according to claim 1, wherein the multiple planar electrodes have a same shape.

19. The antenna module according to claim 1, further comprising:

a feed circuit configured to supply a radio frequency signal to each of the radiating elements.

20. A communication apparatus comprising:

the antenna module according to claim 1.

* * * * *